United States Patent
Mishra et al.

(10) Patent No.: US 10,496,568 B2
(45) Date of Patent: Dec. 3, 2019

(54) TECHNIQUE FOR RFFE AND SPMI REGISTER-0 WRITE DATAGRAM FUNCTIONAL EXTENSION

(71) Applicant: QUALCOMM Incorporated, San Diego, CA (US)

(72) Inventors: Lalan Jee Mishra, San Diego, CA (US); Helena Deirdre O'Shea, San Diego, CA (US); Richard Dominic Wietfeldt, San Diego, CA (US); ZhenQi Chen, South Boston, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/155,554

(22) Filed: Oct. 9, 2018

(65) Prior Publication Data

US 2019/0163649 A1 May 30, 2019

Related U.S. Application Data

(60) Provisional application No. 62/592,696, filed on Nov. 30, 2017.

(51) Int. Cl.
*G06F 13/16* (2006.01)
*G06F 3/06* (2006.01)

(52) U.S. Cl.
CPC ........ *G06F 13/1668* (2013.01); *G06F 3/0604* (2013.01); *G06F 3/0659* (2013.01); *G06F 3/0673* (2013.01)

(58) Field of Classification Search
CPC ..................................................... G06F 13/16
See application file for complete search history.

(56) References Cited

U.S. PATENT DOCUMENTS

| | | | | |
|---|---|---|---|---|
| 6,938,101 | B2 * | 8/2005 | Hayes | ............... G06F 1/1626 348/E5.103 |
| 2007/0299956 | A1 * | 12/2007 | Odaka | ............... H04L 12/2825 709/223 |
| 2017/0116141 | A1 | 4/2017 | Mishra et al. | |
| 2017/0118125 | A1 | 4/2017 | Mishra et al. | |

OTHER PUBLICATIONS

International Search Report and Written Opinion—PCT/US2018/055245—ISA/EPO—dated Feb. 1, 2019.

* cited by examiner

*Primary Examiner* — Cheng Yuan Tseng
(74) *Attorney, Agent, or Firm* — Loza & Loza LLP

(57) ABSTRACT

Systems, methods, and apparatus for functionally extending a capability of a write datagram for RFFE and SPMI devices are provided. A sending device sets a configuration register to indicate an operation mode of a write command and generates a command code field in the write command. A most significant bit of the command code field has a value of 1 and remaining bits of the command code field are defined based on the operation mode. The sending device further includes payload bytes in a payload field of the write command based on the operation mode and sends the write command to a receiver via a bus interface. The sending device may also set a page-address register to include a page-address to be used if page segmented access (PSA) is enabled for the write command and set the configuration register to indicate whether the PSA for the write command is enabled.

26 Claims, 16 Drawing Sheets

| Operation Mode of Register-0 Write | $B_{i-2}$ | $B_{i-1}$ | $B_i$ |
|---|---|---|---|
| Legacy Mode | 0 | X | X |
| Payload = 1 Byte | 1 | 0 | 0 |
| Payload = 2 Bytes | 1 | 1 | 0 |
| Payload = 3 Bytes | 1 | 0 | 1 |
| Payload = 4 Bytes | 1 | 1 | 1 |

900

| $B_j$ | $B_{j-1}$ | $B_{j-2}$ | Operation Mode of Register-0 Write |
|---|---|---|---|
| 0 | 0 | 0 | Legacy Mode |
| 0 | 0 | 1 | Payload = 1 Byte Lower Half-Page |
| 0 | 1 | 0 | Payload = 2 Bytes Lower Half-Page |
| 0 | 1 | 1 | Payload = 3 Bytes Lower Half-Page |
| 1 | 0 | 0 | Command Code Extension Mode |
| 1 | 0 | 1 | Payload = 1 Byte Upper Half-Page |
| 1 | 1 | 0 | Payload = 2 Bytes Upper Half-Page |
| 1 | 1 | 1 | Payload = 3 Bytes Upper Half-Page |

| $B_k$ | $B_{k-1}$ | $B_{k-2}$ | $B_{k-3}$ | Operation Mode of Register-0 Write |
|---|---|---|---|---|
| 0 | 0 | 0 | 0 | Legacy Mode |
| 0 | 0 | 0 | 1 | Payload = 1 Byte Lower Half-Page |
| 0 | 0 | 1 | 0 | Payload = 2 Bytes Lower Half-Page |
| 0 | 0 | 1 | 1 | Payload = 3 Bytes Lower Half-Page |
| 0 | 1 | 0 | 0 | Payload = 4 Bytes Lower Half-Page |
| 0 | 1 | 0 | 1 | Payload = 5 Byte Lower Half-Page |
| 0 | 1 | 1 | 0 | Payload = 6 Bytes Lower Half-Page |
| 0 | 1 | 1 | 1 | Payload = 7 Bytes Lower Half-Page |
| 1 | 0 | 0 | 0 | Command Code Extension Mode |
| 1 | 0 | 0 | 1 | Payload = 1 Byte Upper Half-Page |
| 1 | 0 | 1 | 0 | Payload = 2 Bytes Upper Half-Page |
| 1 | 0 | 1 | 1 | Payload = 3 Bytes Upper Half-Page |
| 1 | 1 | 0 | 0 | Payload = 4 Bytes Upper Half-Page |
| 1 | 1 | 0 | 1 | Payload = 5 Bytes Upper Half-Page |
| 1 | 1 | 1 | 0 | Payload = 6 Bytes Upper Half-Page |
| 1 | 1 | 1 | 1 | Payload = 7 Bytes Upper Half-Page |

*FIG. 10*

TECHNIQUE FOR RFFE AND SPMI REGISTER-0 WRITE DATAGRAM FUNCTIONAL EXTENSION

CROSS-REFERENCE TO RELATED APPLICATIONS

This application claims priority to and the benefit of U.S. Provisional Patent Application No. 62/592,696, filed on Nov. 30, 2017, titled "TECHNIQUE FOR RFFE AND SPMI REGISTER-0 WRITE DATAGRAM FUNCTIONAL EXTENSION", the entire contents of which is incorporated herein by reference.

TECHNICAL FIELD

The present disclosure relates generally to data transfer, and more particularly, to functionally extending a capability of a write datagram for radio frequency front end (RFFE) and system power management interface (SPMI) devices.

BACKGROUND

As the mobile device market mushroomed with the development of multifunctional smartphones, cellular communication complexity has increased accordingly. It is now conventional for a radio front end of a mobile device to cover as many as ten or more frequency bands. The radio front end thus requires multiple power amplifiers, diplexers, low-noise amplifiers, antenna switches, filters, and other radio frequency (RF) front end devices to accommodate the radio signaling complexity. These various RF front end devices are in turn controlled by a host or master device such as a radio frequency integrated circuit (RFIC). As the RF front end complexity increased, the need for a standardized protocol to control the many different devices lead to the development of the Mobile Industry Processor Interface (MIPI) RF Front End Control Interface (RFFE) standard.

The RFFE standard specifies a serial bus that includes a clock line and a bidirectional data line. Through the RFFE bus, an RFFE master device may read from, and write to, registers in a plurality of RFFE slave devices so as to control the RF front end devices. The read and write commands are organized in the RFFE standard into protocol messages that may each include an initial sequence start condition (SSC), a command frame, a data payload, and a final bus park cycle (BPC). The protocol messages include register commands, extended register commands, and extended register long commands. The protocol messages may further include broadcast commands. The register, extended register, and extended register long commands (three types of commands) can all be either read or write commands. With regard to the three types of commands, the registers in each of the RFFE slave devices are organized into a 16-bit wide address space (0x0000-0xFFFF in hexadecimal). Each of the three types of commands includes a command frame that addresses a specific RFFE slave device as well as the register address. A command frame in the register command (register command frame) is directed to the registers in the first five bits of an address space (0x00-0x1F) such that only five register address bits are needed. The register command frame is followed by an 8-bit data payload frame. In contrast, an extended register command frame includes eight register address bits and may be followed by up to 16 bytes of data. Finally, an extended register long command frame includes a full 16-bit register address so it can uniquely identify any register in the addressed RFFE slave device. The extended register long command frame may be followed by up to eight bytes of data.

Each of the commands begins with a unique sequence start condition (SSC) that is then followed by a corresponding command frame, some number of data frames, and finally a bus park cycle (BPC) to signal the end of the command. The latency involved with transmitting any of the commands thus depends on the number of bits in its various frames as well as the clocking speed for the RFFE clock line. Under the RFFE protocol, each bit of a transmitted frame corresponds to a period of the clock since the transmission is single data rate (SDR), which corresponds to one bit per clock cycle. For example, an SDR results from transmitting a bit responsive to each rising edge (or to just the falling edges) of the clock. The maximum clocking speed is 52 MHz in the RFFE v2 specification. This clocking rate has increased relative to previous versions of the RFFE protocol and is associated with increased power consumption. Each of the three types of RFFE commands—extended register, extended register long, and register—may be either a read or a write command.

On the RFFE bus architecture, as well as a system power management interface (SPMI) bus architecture, a particular command such as a Register-0 Write command provides a low latency technique for a bus master device to write 7-bit data at a fixed location (address: 0x0000, i.e., Register-0) of an addressed slave. While an existing Register-0 Write datagram may facilitate the sending of 7 bits of data to a fixed location (address: 0x0000) of a targeted device with minimal latency, emerging applications in developing technologies (e.g., 5G) demand more than 7 bits of data to be sent to a location of choice within an entire 64K register space, while improving latency over existing register-write techniques.

However, no such technique currently exists. Sending 8 bits of data or multiple bytes of data to any arbitrary location within the entire 64K register space requires the use of conventional register-write techniques and does not improve upon latency reduction. Accordingly, there is a need in the art for a novel technique that extends the data transportation capability of the Register-0 Write command in the entire 64K register space while maintaining full backward compatibility with legacy RFFE and SPMI devices.

SUMMARY

Certain aspects of the disclosure relate to systems, apparatus, methods and techniques that functionally extend a capability of a write datagram for radio frequency front end (RFFE) and system power management interface (SPMI) devices.

In various aspects of the disclosure, a method of sending a write command to a receiver via a bus interface is provided. The method includes setting a configuration register to indicate an operation mode of the write command, setting a page-address register to include a page-address to be used if page segmented access (PSA) is enabled for the write command, setting the configuration register to indicate whether the PSA for the write command is enabled, generating a command code field in the write command, wherein a most significant bit of the command code field has a value of 1 and remaining bits of the command code field are defined based on the operation mode, including payload bytes in a payload field of the write command based on the operation mode, and sending the write command to the receiver, In another aspect of the disclosure, a sending device for sending a write command to a receiver is provided. The sending device includes a bus interface and a processing circuit configured to set a configuration register to indicate an operation mode of the write command, set a page-address register to include a page-address to be used if page segmented access (PSA) is enabled for the write command, set the configuration register to indicate whether the PSA for the write command is enabled, generate a command code field in the write command, wherein a most significant bit of the command code field has a value of 1 and remaining bits of the command code field are defined based on the operation mode, include payload bytes in a payload field of the write command based on the operation mode, and send the write command to the receiver via the bus interface.

In another aspect of the disclosure, a sending device for sending a write command to a receiver via a bus interface is provided. The sending device includes means for setting a configuration register to indicate an operation mode of the write command, means for setting a page-address register to include a page-address to be used if page segmented access (PSA) is enabled for the write command, wherein the means for setting the configuration register is configured to indicate whether the PSA for the write command is enabled, means for generating a command code field in the write command, wherein a most significant bit of the command code field has a value of 1 and remaining bits of the command code field are defined based on the operation mode, means for including payload bytes in a payload field of the write command based on the operation mode, and means for sending the write command to the receiver via the bus interface.

In an aspect of the disclosure, a method of receiving a write command from a sender via a bus interface is provided. The method includes receiving a mode setting message for setting a configuration register to indicate an operation mode of the write command; receiving a page-address setting message for setting a page-address register to include a page-address to be used if page segmented access (PSA) is enabled for the write command, wherein the mode setting message further sets the configuration register to indicate whether the PSA for the write command is enabled, receiving the write command from the sender, reading a command code field in the write command, wherein a most significant bit of the command code field has a value of 1 and remaining bits of the command code field are interpreted based on the operation mode, and detecting whether a payload field of the write command includes payload bytes to be processed based on the operation mode.

In another aspect of the disclosure, a receiving device for receiving a write command from a sender is provided. The receiving device includes a bus interface and a processing circuit configured to receive a mode setting message for setting a configuration register to indicate an operation mode of the write command, receive a page-address setting message for setting a page-address register to include a page-address to be used if page segmented access (PSA) is enabled for the write command, wherein the mode setting message further sets the configuration register to indicate whether the PSA for the write command is enabled, receive the write command from the sender via the bus interface, read a command code field in the write command, wherein a most significant bit of the command code field has a value of 1 and remaining bits of the command code field are interpreted based on the operation mode, and detect whether a payload field of the write command includes payload bytes to be processed based on the operation mode.

In a further aspect of the disclosure, a receiving device for receiving a write command from a sender via a bus interface is provided. The receiving device includes means for receiving a mode setting message for setting a configuration register to indicate an operation mode of the write command, means for receiving a page-address setting message for setting a page-address register to include a page-address to be used if page segmented access (PSA) is enabled for the write command, wherein the mode setting message further sets the configuration register to indicate whether the PSA for the write command is enabled, means for receiving the write command from the sender, means for reading a command code field in the write command, wherein a most significant bit of the command code field has a value of 1 and remaining bits of the command code field are interpreted based on the operation mode, and means for detecting whether a payload field of the write command includes payload bytes to be processed based on the operation mode.

BRIEF DESCRIPTION OF THE DRAWINGS

FIG. 9 is a table illustrating another example of configuration register bit values and a corresponding operation mode of the Register-0 Write command in accordance with certain aspects disclosed herein.

FIG. 10 is a table illustrating a further example of configuration register bit values and a corresponding operation mode of the Register-0 Write command in accordance with certain aspects disclosed herein.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Exemplary Apparatus with Multiple IC Device Subcomponents

Figure 1:
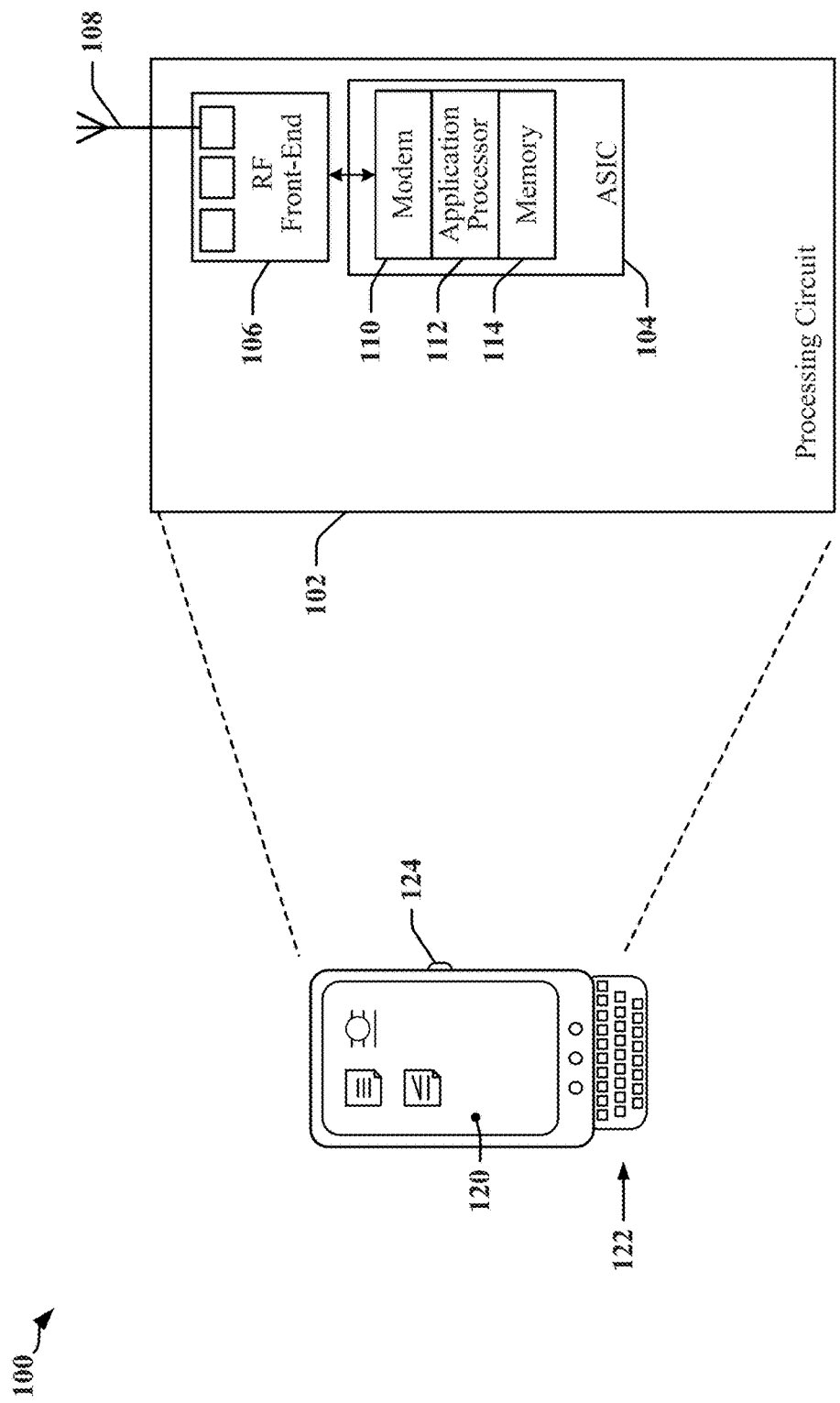
FIG. 1 illustrates an apparatus that includes an RF front end (RFFE) that may be adapted according to certain aspects disclosed herein.

Certain aspects of the invention may be applicable to communications links deployed between electronic devices that include subcomponents of an apparatus such as a telephone, a mobile computing device, an appliance, automobile electronics, avionics systems, etc. FIG. 1 depicts an apparatus 100 that may employ a communication link between IC devices. In one example, the apparatus 100 may be a mobile communication device. The apparatus 100 may include a processing circuit having two or more IC devices 104, 106 that may be coupled using a first communication link One IC device may be an RF front end device 106 that enables the apparatus to communicate through one or more antennas 108 with a radio access network, a core access network, the Internet and/or another network. The RF front end device 106 may include a plurality of devices coupled by a second communication link, which may include an RFFE, bus.

The processing circuit 102 may include one or more application-specific IC (ASIC) devices 104. In one example, an ASIC device 104 may include and/or be coupled to one or more processing devices 112, logic circuits, one or more modems 110, and processor readable storage such as a memory device 114 that may maintain instructions and data that may be executed by a processor on the processing circuit 102. The processing circuit 102 may be controlled by one or more of an operating system and an application programming interface (API) layer that supports and enables execution of software modules residing in storage media. The memory device 114 may include read-only memory (ROM) or random-access memory (RAM), electrically erasable programmable ROM (EEPROM), flash cards, or any memory device that can be used in processing systems and computing platforms. The processing circuit 102 may include or have access to a local database or parameter storage that can maintain operational parameters and other information used to configure and operate apparatus 100. The local database may be implemented using one or more of a database module, flash memory, magnetic media, EEPROM, optical media, tape, soft or hard disk, or the like. The processing circuit may also be operably coupled to external devices such as the antennas 108, a display 120, operator controls, such as a button 124 and/or an integrated or external keypad 122, among other components.

Overview of Bus Architecture

Figure 2:
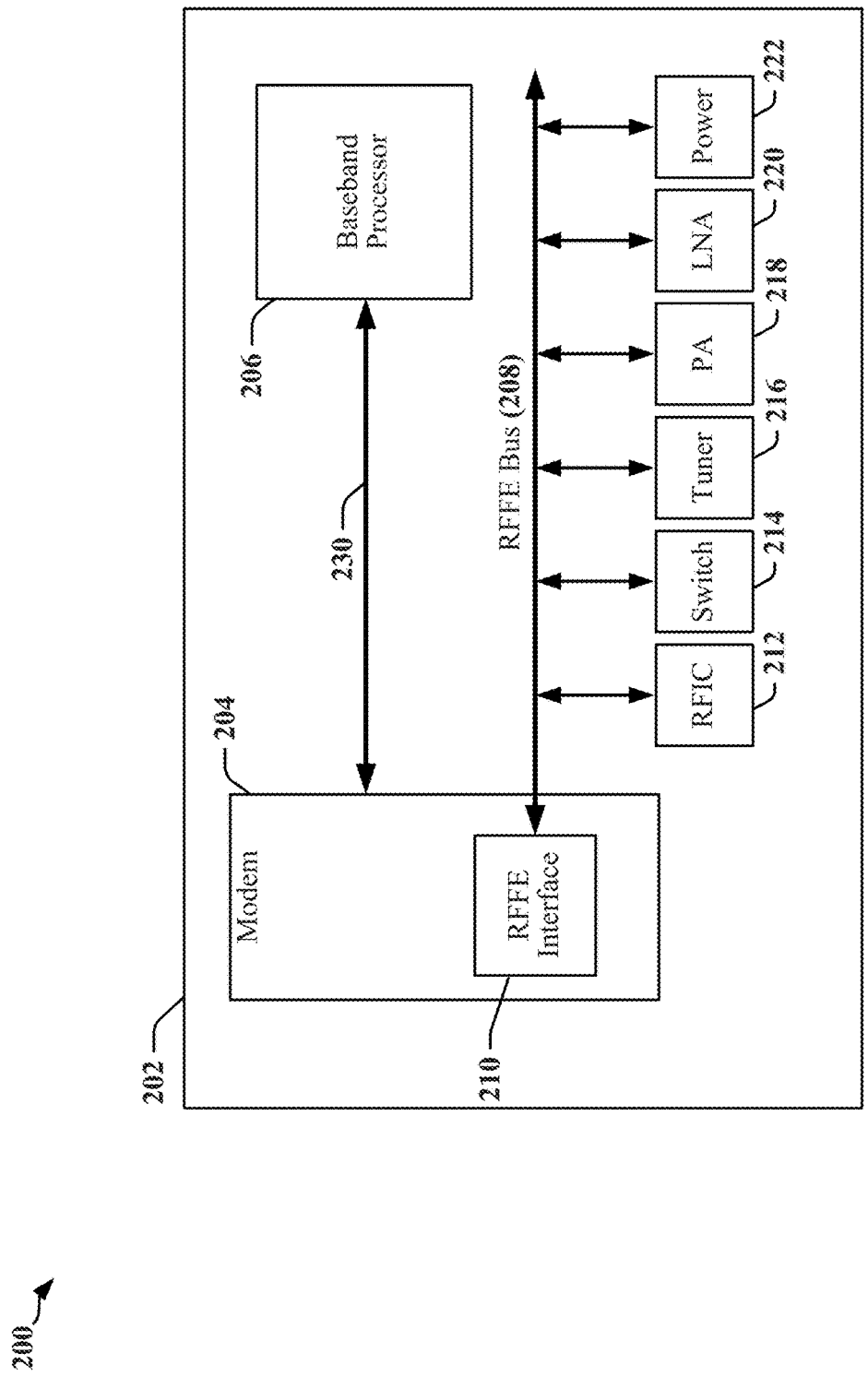
FIG. 2 is a block diagram illustrating a device that employs an RFFE bus to couple various front end devices.

FIG. 2 is a block diagram 200 illustrating an example of a device 202 that employs an RFFE bus 208 to couple various front end devices 212, 214, 216, 218, 220, and 222. Although the device 202 will be described with respect to an RFFE interface and bus architecture, it is contemplated that the device 302 may also apply to a system power management interface (SPMI) and bus architecture. A modem 204 including an RFFE interface 210 may also be coupled to the RFFE bus 208. In various examples, the device 202 may be implemented with one or more baseband processors 206, one or more other communication links 230, and various other buses, devices and/or different functionalities. In the example, the modem 204 may communicate with a baseband processor 206, and the device 202 may be embodied in one or more of a mobile computing device, a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, avionics systems, a wearable computing device (e.g., a smart watch, a health or fitness tracker, eyewear, etc.), an appliance, a sensor, a security device, a vending machine, a smart meter, a drone, a multicopter, or any other similar functioning device.

The RFFE bus 208 may be coupled to an RF integrated circuit (RFIC) 212, which may include one or more controllers, and/or processors that configure and control certain aspects of the RF front end. The RFFE, bus 208 may couple the RFIC 212 to a switch 214, an RF tuner 216, a power amplifier (PA) 218, a low noise amplifier (LNA) 220, and a power management module 222.

In an example, the baseband processor 206 may be a master device. The master device/baseband processor 206 may drive the RFFE bus 208 to control the various front end devices 212, 214, 216, 218, 220, and 222. During transmission, the baseband processor 206 may control the RFFE interface 210 to select the power amplifier 218 for a corresponding transmission band. In addition, the baseband processor 206 may control the switch 214 so that the resulting transmission may propagate from an appropriate antenna. During reception, the baseband processor 206 may control the RFFE interface 210 to receive from the low noise amplifier 220 depending on the corresponding transmission band. It will be appreciated that numerous other components may be controlled through the RFFE bus 208 in this fashion such that the device 202 is merely representative and not limiting. Moreover, other devices such as the RFIC 212 may serve as an RFFE master device in alternative embodiments.

Figure 3:
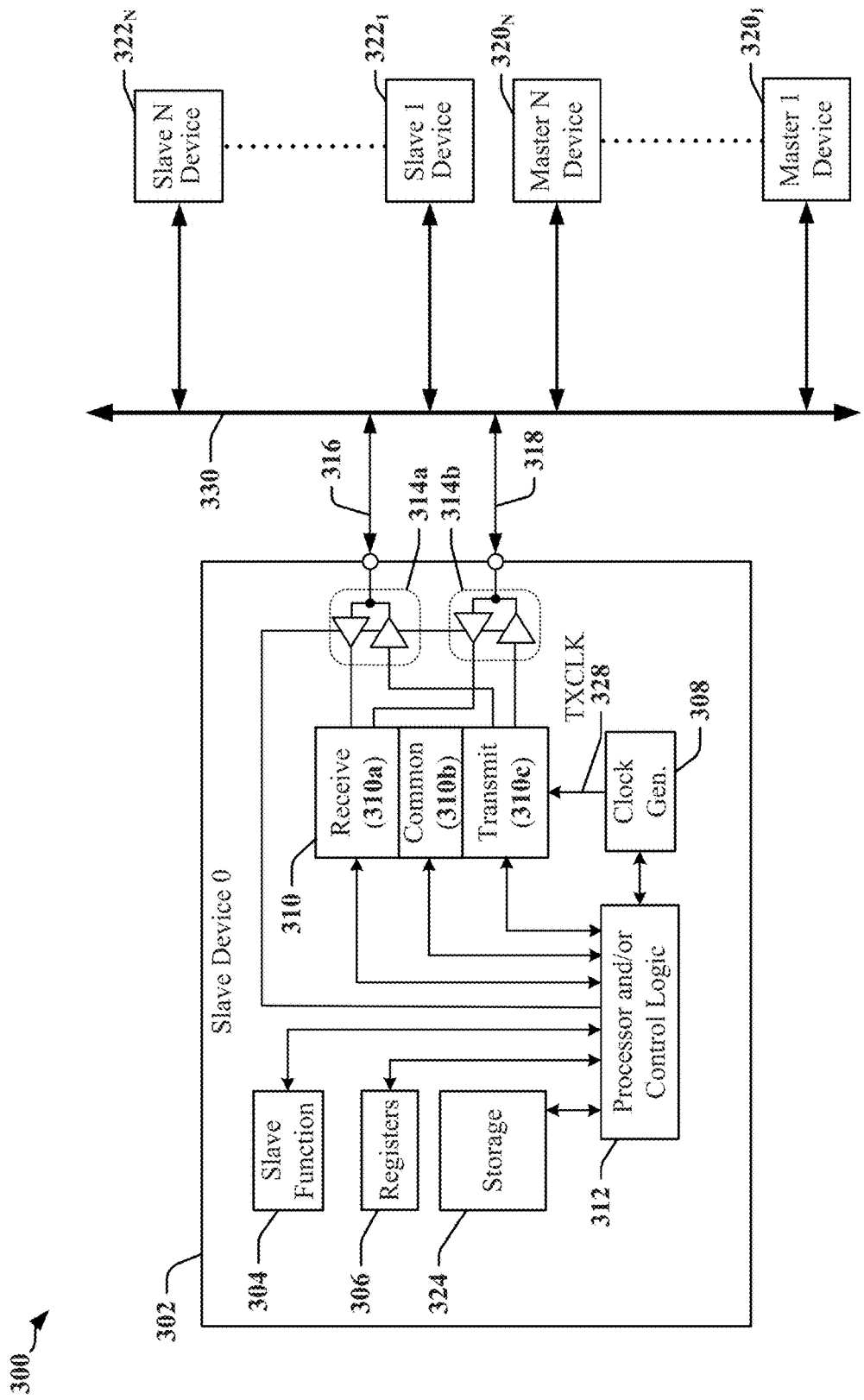
FIG. 3 illustrates an example of a system architecture for an apparatus employing a data link between IC devices according to certain aspects disclosed herein.

FIG. 3 is a block schematic diagram illustrating an example of an architecture for a device 300 that may employ an RFFE bus 330 to connect bus master devices $320_1$-$320_N$ and slave devices 302 and $322_1$-$322_N$. The RFFE bus 330 may be configured according to application needs, and access to multiple buses 330 may be provided to certain of the devices $320_1$-$320_N$, 302, and $322_1$-$322_N$. In operation, one of the bus master devices $320_1$-$320_N$ may gain control of the bus and transmit a slave identifier (slave address) to identify one of the slave devices 302 and $322_1$-$322_N$ to engage in a communication transaction. Bus master devices $320_1$-$320_N$ may read data and/or status from slave devices 302 and $322_1$-$322_N$, and may write data to memory or may configure the slave devices 302 and $322_1$-$322_N$. Configuration may involve writing to one or more registers or other storage on the slave devices 302 and $322_1$-$322_N$.

In the example illustrated in FIG. 3, a first slave device 302 coupled to the RFFE bus 330 may respond to one or more bus master devices $320_1$-$320_N$, which may read data from, or write data to the first slave device 302. In one example, the first slave device 302 may include or control a power amplifier (see the PA 218 in FIG. 2), and one or more bus master devices $320_1$-$320_N$ may from time-to-time configure a gain setting at the first slave device 302.

The first slave device 302 may include RFFE registers 306 and/or other storage devices 324, a processing circuit and/or control logic 312, a transceiver 310 and an interface including a number of line driver/receiver circuits 314a, 314b as needed to couple the first slave device 302 to the RFFE bus 330, e.g., via a serial clock line (SCLK) 316 and a serial data line (SDATA) 318. The processing circuit and/or control logic 312 may include a processor such as a state machine, sequencer, signal processor or general-purpose processor. The interface may be implemented using the state machine. Alternatively, the interface may be implemented in software on a suitable processor if included in the first slave device 302. The transceiver 310 may include one or more receivers 310a, one or more transmitters 310c and certain common circuits 310b, including timing, logic and storage circuits and/or devices. In some instances, the transceiver 310 may include encoders and decoders, clock and data recovery circuits, and the like. A transmit clock (TX-CLK) signal 328 may be provided to the transmitter 310c, where the TXCLK signal 328 can be used to determine data transmission rates.

The RFFE bus 330 is typically implemented as a serial bus in which data is converted from parallel to serial form by a transmitter, which transmits the encoded data as a serial bitstream. A receiver processes the received serial bitstream using a serial-to-parallel converter to deserialize the data. The serial bus may include two or more wires, and a clock signal may be transmitted on one wire with serialized data being transmitted on one or more other wires. In some instances, data may be encoded in symbols, where each bit of a symbol controls the signaling state of a wire of the RFFE bus 330.

To control the slave devices 302 and $322_1$-$322_N$, a master device (e.g., one of master devices $320_1$-$320_N$) either writes or reads to RFFE registers within the slave devices, e.g., the RFFE registers 306 within the first slave device 302. The RFFE registers 306 may be arranged according to an RFFE register address space that ranges from a zeroth (0) address to a 65535 address. In other words, each slave device may include up to 65,536 registers. To address such a number of registers, 16 register address bits for each of the slave devices 302 and $322_1$-$322_N$ are required. The master device may read from or write to the registers 306 in each slave device using one of the three types of commands discussed above (register command, extended register command, or extended register long command). For example, the register command addresses only the first 32 registers 306 in the address space for each of the slave devices 302 and $322_1$-$322_N$. In this fashion, the register command requires only five register address bits. In contrast, the extended register command may initially access up to the first 256 registers in each of the slave devices 302 and $322_1$-$322_N$. A corresponding 8-bit register address for the extended register command acts as a pointer in that the data payload for the extended register command may include up to 16 bytes. A corresponding read or write operation for an extended register command may thus extend across 16 registers starting from the register identified by the 8-bit register address. The extended register long command includes a 16-bit register address which may act as a pointer to any of the possible 65,536 registers in each slave device. The data payload for an extended register long command may include up to eight bytes so that the corresponding read or write operation for the extended register long command may extend across eight registers starting from the register identified by the 16-bit address. In an aspect of the disclosure, up to 15 slave devices may be coupled to one RFFE bus. If a front end includes more than 15 slave devices, additional RFFE busses may be provided.

Overview of Register-0 Write Command

The RFFE protocol and the SPMI protocol may provide for a number of command frames. Each command frame begins with a 2-bit sequence start code (SSC) followed by a 4-bit slave address. After the 4-bit slave address, an 8-bit command code is provided, followed by a parity bit (P). Depending on the type of 8-bit command code provided, a command frame may be followed by additional payload bytes indicating an address, data, ACK/NACK, etc.

In general, the 8-bit command code is an 8-bit binary value yielding no more than 256 variations. In the RFFE protocol and the SPMI protocol, all but one of the command codes have a most significant bit of "0" covering 128 variations of 8-bit binary values. The lone command code having a most significant bit of "1" corresponds to a Register-0 Write command covering another 128 variations of 8-bit binary values.

Figure 4:
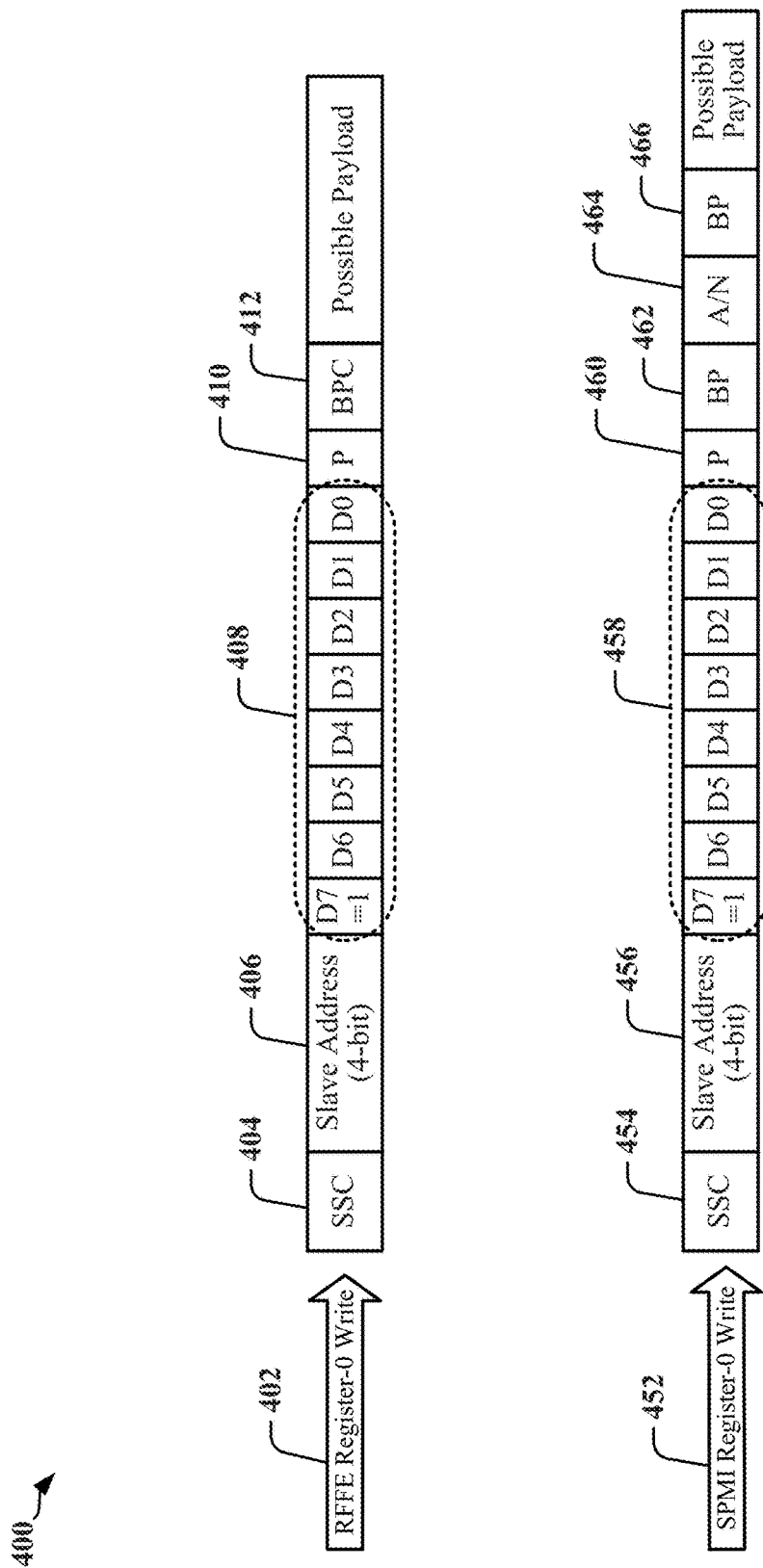
FIG. 4 is a diagram illustrating an RFFE Register-0 Write command frame and an SPMI Register-0 Write command frame in accordance with certain aspects disclosed herein.

FIG. 4 is a diagram 400 illustrating an RFFE Register-0 Write command frame 402 and an SPMI Register-0 Write command frame 452. With respect to the RFFE protocol, the RFFE Register-0 Write command frame 402 begins with a 2-bit sequence start code (SSC) 404 followed by a 4-bit slave address 406, an 8-bit command code 408, a parity bit (P) 410, and a bus park cycle (BPC) 412. The most significant bit (MSB) of the 8-bit command code 408 corresponds to D7. Accordingly, the command frame 402 may be distinguished as a Register-0 Write command frame when the MSB D7 is equal to "1". Moreover, when the command frame 402 is the Register-0 Write command frame, the remaining 7 bits (D6, D5, D4, D3, D2, D1, and D0) after D7=1 in the 8-bit command code 408 corresponds to actual 7-bit data. As such, with the RFFE Register-0 Write command frame 402, the corresponding 8-bit command code 408 itself contains the data of interest. However, the RFFE Register-0 Write command frame 402 may be limited as it is only capable of communicating 7 bits of data.

With respect to the SPMI protocol, utilization of the Register-0 Write command frame is similar to the RFFE protocol. The SPMI Register-0 Write command frame 452 also begins with a 2-bit sequence start code (SSC) 454 followed by a 4-bit slave address 456, an 8-bit command code 458, and a parity bit (P) 460. However, following the parity bit (P) 460, a bus park (BP) 462 is provided followed by an ACK/NACK bit (A/N) 464 and another bus park (BP) 466. The most significant bit (MSB) of the 8-bit command code 458 corresponds to D7. Accordingly, the command frame 452 may be distinguished as a Register-0 Write command frame when the MSB D7 is equal to "1". Moreover, when the command frame 452 is the Register-0 Write command frame, the remaining 7 bits (D6, D5, D4, D3, D2, D1, and D0) after D7=1 in the 8-bit command code 458 corresponds to actual 7-bit data. As such, with the SPMI Register-0 Write command frame 452, the corresponding 8-bit command code 458 itself contains the data of interest. However, the SPMI Register-0 Write command frame 402 may be limited as it is only capable of communicating 7 bits of data.

As mentioned above, an 8-bit command code is an 8-bit binary value yielding no more than 256 variations. In the RFFE/SPMI protocol, 128 functional 8-bit variations may be enabled using the various command codes having the MSB of "0". Moreover, another 128 functional 8-bit variations may be enabled using the lone command having the MSB of "1", which is the Register-0 Write command.

In some aspects, the Register-0 Write command may be utilized as a command code container. While the approach may serve some applications, the approach may have some drawbacks. For example, a maximum number of command codes is limited to 128. Moreover, only one command code may be active at any given time because only one Register-0 Write command exists to transport a given command code. Additionally, a command code decoder is needed to understand what the 7 bits (e.g., D6, D5, D4, D3, D2, D1, and D0) following D7 mean in the Register-0 Write command. This leads to penalties, such as the use of additional circuitry and increased Silicon area, power, and cost.

In accordance with the present disclosure, a novel technique is provided that extends the data transportation capability of the Register-0 Write command to lower latency without using additional circuitry and/or increasing Silicon area, power, and cost. Aspects of the present disclosure regarding the novel technique for using the Register-0 Write command may apply to the RFFE protocol, the SPMI protocol, and other interface protocols.

In an aspect, a Register-0 Write command may be modified by way of an additional configuration register. The configuration register may be set ahead of time. In an example, the configuration register may be set to indicate that the Register-0 Write command will be used in a legacy manner (legacy mode). That is, the configuration register may be set in a certain way to indicate that the 7 bits (D6, D5, D4, D3, D2, D1, and D0) following D7 in the 8-bit command code of the Register-0 Write command correspond to actual 7-bit data, and therefore, the 8-bit command code itself contains the data of interest.

In a further aspect, the configuration register may be set to indicate that the functionality of the Register-0 Write command is extended to indicate a register address (address extension mode). For example, the configuration register may be set to indicate that the 7 bits (D6, D5, D4, D3, D2, D1, and D0) following D7 in the 8-bit command code of the Register-0 Write command correspond to a 7-bit address and an additional number of payload bytes (e.g., 1, 2, or 3 payload bytes) to be processed follow the Register-0 Write command (e.g., additional payload bytes may follow the BPC 412 of RFFE, Register-0 Write command 402 or the BP 466 of SPMI Register-0 Write command 452). The location the payload bytes are to be written into may depend on an address specified (e.g., upper half-page or lower half-page).

In another aspect, the configuration register may be set to indicate that the functionality of the Register-0 Write command is extended to indicate additional commands (command code extension mode). For example, the configuration register may be set to indicate that the 7 bits (D6, D5, D4, D3, D2, D1, and D0) following D7 in the 8-bit command code of the Register-0 Write command correspond to one of a possible 128 additional command codes. As such, the additional command codes may indicate more than 16 bytes of register reads and writes using only one datagram (Register-0 Write command) Moreover, the additional command codes may indicate electrical signaling beyond what is currently defined in the RFFE/SPMI protocol. The signaling may include interrupt signaling, error signaling, flow control signaling, etc.

Overview of Register Space

Figure 5:
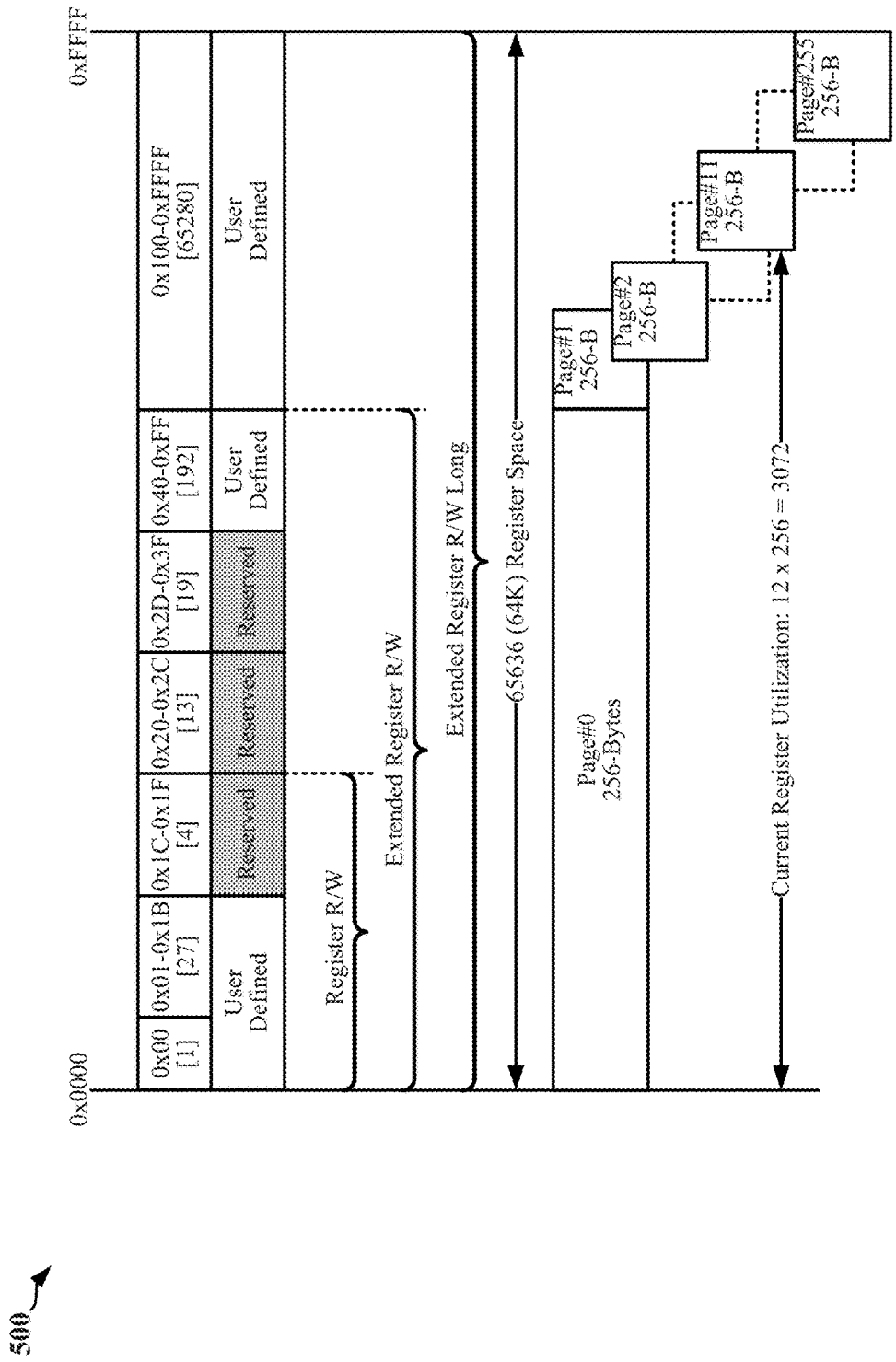
FIG. 5 is a diagram of an RFFE register space.

FIG. 5 is a diagram of an RFFE register space 500. The RFFE register space 500 may extend from register 0x0000 to register 0xFFFF in hexadecimal.

An association of commands in terms of register space accessibility is shown in FIG. 5. The reach of an extended register operation may be limited to the space between the 0x00 register and the 0xFF register. However, a complex RFFE slave may contain multiple pages (each having 0x00 to 0xFF 1-byte locations) within the 64K register space, and therefore, enable extended register operation to access the entire 64K register space and reduce bus latency. To achieve this, the 64K register space may be segmented into 256 pages (pages 0x00 to 0xFF), each containing 256 register locations. An 8-bit register address in a datagram combined with a page address allows any register access within the 64K space. The page address may be stored at a known register location and may be combined as an address-MSB with the datagram-supplied 8-bit register address (address-LSB). This may be the basis for page segmented access for an extended register operation.

Figure 6:
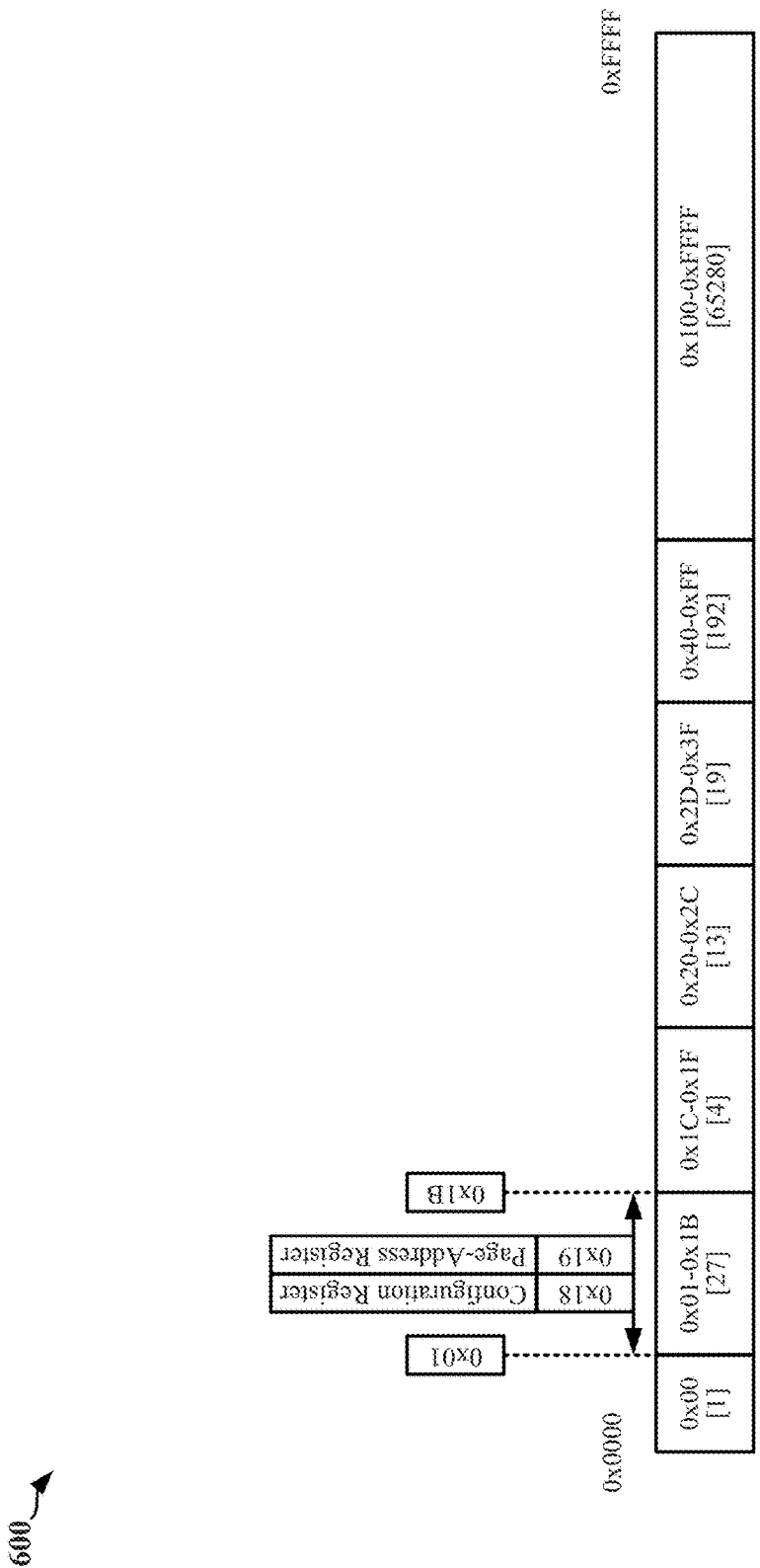
FIG. 6 is a diagram of an RFFE register space having a configuration register and a page-address register in accordance with certain aspects disclosed herein.

FIG. 6 is a diagram of an RFFE register space 600 having a configuration register and a page-address register. To facilitate the enabling and disabling of various features, an 8-bit configuration register may be used. The configuration register and a page-address register may use two specific registers in the register space that are register-mode accessible. For example, as shown in FIG. 6, the configuration register may be defined at location 0x18 and the page-address register may be defined at location 0x19 in the register space. Both the 0x18 and 0x19 locations are in a user defined space.

Overview of Configuration Register

In an aspect of the disclosure, the 8-bit configuration register may be utilized to provide a control function interface to facilitate the functional extending of the Register-0 Write command. The configuration register may be located within a user defined register space: 0x01 to 0x1C in hexadecimal. For example, register location 0x18 may be used as the configuration register. However, in alternative aspects, it is contemplated that the configuration register may be at any location within an entire register space.

Figure 7:
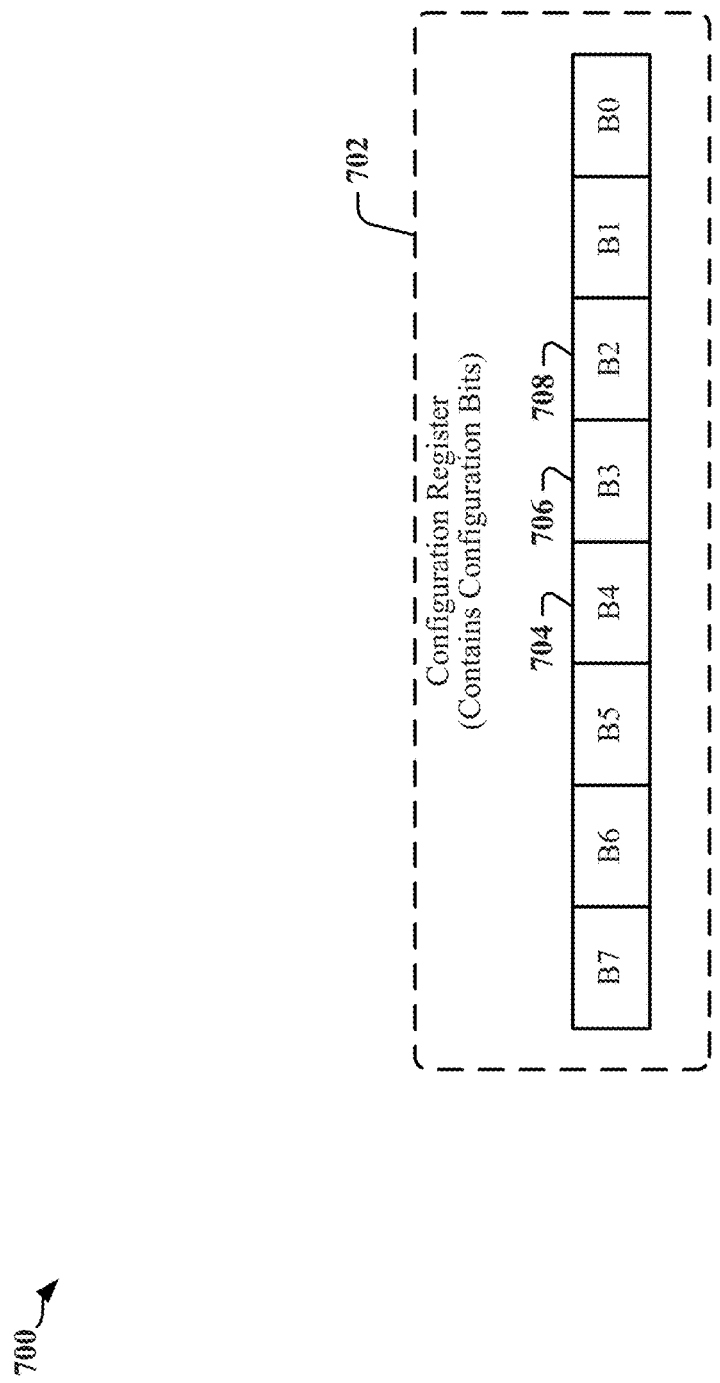
FIG. 7 is a diagram illustrating an example bit structure of a configuration register in accordance with certain aspects disclosed herein.

FIG. 7 is a diagram illustrating an example bit structure 700 of a configuration register 702. As shown, the configuration register 702 includes eight configuration register bits B7, B6, B5, B4, B3, B2, B1, and B0. In an aspect of the disclosure, three consecutive register bits of the configuration register 702 may be used to indicate an operation mode of the Register-0 Write command. For example, a register bit B4 704, a register bit B3 706, and a register bit B2 708 may be used for such purpose. However, it is contemplated that any other set of three consecutive register bits may be used. In other aspects of the disclosure, any number of consecutive register bits (e.g., four consecutive register bits) of the configuration register 702 may be used to indicate an operation mode of the Register-0 Write command.

Figure 8:
FIG. 8 is a table illustrating an example of configuration register bit values and a corresponding operation mode of the Register-0 Write command in accordance with certain aspects disclosed herein.

FIG. 8 is a table 800 illustrating an example of configuration register bit values and a corresponding operation mode of the Register-0 Write command. As shown in FIG. 8, bits $B_i$, $B_{i-1}$, and $B_{i-2}$ may correspond to three consecutive register bits of a configuration register (e.g., register bits B4 704, B3 706, and B2 708 of the configuration register 702).

When the bit $B_{i-2}$ is set to a value of 0 and the bits B, and $B_{i-1}$ are set to any value X, this may indicate that the Register-0 Write command will be used in a legacy manner (legacy mode). That is, the 7 bits (D6, D5, D4, D3, D2, D1, and D0) following D7 in the 8-bit command code of the Register-0 Write command correspond to actual 7-bit data, and therefore, the 8-bit command code itself contains the data of interest.

When the bit $B_{i-2}$ is set to a value of 1, the bit B, is set to a value of 0, and the bit $B_{i-1}$ is set to a value of 0, this may indicate that the 7 bits (D6, D5, D4, D3, D2, D1, and D0) following D7 in the 8-bit command code of the Register-0 Write command correspond to a 7-bit address and one payload byte of interest to be processed in conjunction with the 7-bit address follows the Register-0 Write command (e.g., one payload byte follows the BPC 412 of RFFE Register-0 Write command 402 or the BP 466 of SPMI Register-0 Write command 452).

When the bit $B_{i-2}$ is set to a value of 1, the bit B, is set to a value of 0, and the bit $B_{i-1}$ is set to a value of 1, this may indicate that the 7 bits (D6, D5, D4, D3, D2, D1, and D0) following D7 in the 8-bit command code of the Register-0 Write command correspond to a 7-bit address and two payload bytes of interest to be processed in conjunction with the 7-bit address follow the Register-0 Write command (e.g., two payload bytes follow the BPC 412 of RFFE Register-0 Write command 402 or the BP 466 of SPMI Register-0 Write command 452).

When the bit $B_{i-2}$ is set to a value of 1, the bit B, is set to a value of 1, and the bit $B_{i-1}$ is set to a value of 0, this may indicate that the 7 bits (D6, D5, D4, D3, D2, D1, and D0) following D7 in the 8-bit command code of the Register-0 Write command correspond to a 7-bit address and three payload bytes of interest to be processed in conjunction with the 7-bit address follow the Register-0 Write command (e.g., three payload bytes follow the BPC 412 of RFFE Register-0 Write command 402 or the BP 466 of SPMI Register-0 Write command 452).

When the bit $B_{i-2}$ is set to a value of 1, the bit B, is set to a value of 1, and the bit $B_{i-1}$ is set to a value of 1, this may indicate that the 7 bits (D6, D5, D4, D3, D2, D1, and D0) following D7 in the 8-bit command code of the Register-0 Write command correspond to a 7-bit address and four payload bytes of interest to be processed in conjunction with the 7-bit address follow the Register-0 Write command (e.g., four payload bytes follow the BPC 412 of RFFE Register-0 Write command 402 or the BP 466 of SPMI Register-0 Write command 452).

FIG. 9 is a table 900 illustrating another example of configuration register bit values and a corresponding operation mode of the Register-0 Write command. As shown in FIG. 9, bits $B_j$, $B_{j-1}$, and $B_{j-2}$ may correspond to three consecutive register bits of a configuration register (e.g., register bits B4 704, B3 706, and B2 708 of the configuration register 702).

When the bits $B_j$, $B_{j-1}$, and $B_{j-2}$ are all set to a value 0, this may indicate that the Register-0 Write command will be used in a legacy manner (legacy mode). That is, the 7 bits (D6, D5, D4, D3, D2, D1, and D0) following D7 in the 8-bit command code of the Register-0 Write command correspond to actual 7-bit data, and therefore, the 8-bit command code itself contains the data of interest to be processed.

When the bit $B_j$ is set to a value of 0, the bit $B_{j-1}$ is set to value of 0, and the bit $B_{j-2}$ is set to a value 1, this may indicate that the 7 bits (D6, D5, D4, D3, D2, D1, and D0) following D7 in the 8-bit command code of the Register-0 Write command correspond to a 7-bit address and one payload byte of interest to be processed at a lower half of a specified page in conjunction with the 7-bit address follows the Register-0 Write command (e.g., one payload byte follows the BPC 412 of RFFE Register-0 Write command 402 or the BP 466 of SPMI Register-0 Write command 452).

When the bit $B_j$ is set to a value of 0, the bit $B_{j-1}$ is set to value of 1, and the bit $B_{j-2}$ is set to a value 0, this may indicate that the 7 bits (D6, D5, D4, D3, D2, D1, and D0) following D7 in the 8-bit command code of the Register-0 Write command correspond to a 7-bit address and two payload bytes of interest to be processed at a lower half of a specified page in conjunction with the 7-bit address follow the Register-0 Write command (e.g., two payload bytes follow the BPC 412 of RFFE Register-0 Write command 402 or the BP 466 of SPMI Register-0 Write command 452).

When the bit $B_j$ is set to a value of 0, the bit $B_{j-1}$ is set to value of 1, and the bit $B_{j-2}$ is set to a value 1, this may indicate that the 7 bits (D6, D5, D4, D3, D2, D1, and D0) following D7 in the 8-bit command code of the Register-0 Write command correspond to a 7-bit address and three payload bytes of interest to be processed at a lower half of a specified page in conjunction with the 7-bit address follow the Register-0 Write command (e.g., three payload bytes follow the BPC 412 of RFFE Register-0 Write command 402 or the BP 466 of SPMI Register-0 Write command 452).

When the bit $B_j$ is set to a value of 1, the bit $B_{j-1}$ is set to value of 0, and the bit $B_{j-2}$ is set to a value 0, this may indicate that the Register-0 Write command will be used in a command code extension mode to indicate additional commands. That is, the 7 bits (D6, D5, D4, D3, D2, D1, and D0) following D7 in the 8-bit command code of the Register-0 Write command may correspond to one of a possible 128 command codes.

When the bit $B_j$ is set to a value of 1, the bit $B_{j-1}$ is set to value of 0, and the bit $B_{j-2}$ is set to a value 1, this may indicate that the 7 bits (D6, D5, D4, D3, D2, D1, and D0) following D7 in the 8-bit command code of the Register-0 Write command correspond to a 7-bit address and one payload byte of interest to be processed at an upper half of a specified page in conjunction with the 7-bit address follows the Register-0 Write command (e.g., one payload byte follows the BPC 412 of RFFE Register-0 Write command 402 or the BP 466 of SPMI Register-0 Write command 452).

When the bit $B_j$ is set to a value of 1, the bit $B_{j-1}$ is set to value of 1, and the bit $B_{j-2}$ is set to a value 0, this may indicate that the 7 bits (D6, D5, D4, D3, D2, D1, and D0) following D7 in the 8-bit command code of the Register-0 Write command correspond to a 7-bit address and two payload bytes of interest to be processed at an upper half of a specified page in conjunction with the 7-bit address follow the Register-0 Write command (e.g., two payload bytes follow the BPC 412 of RFFE Register-0 Write command 402 or the BP 466 of SPMI Register-0 Write command 452).

When the bit $B_j$ is set to a value of 1, the bit $B_{j-1}$ is set to value of 1, and the bit $B_{j-2}$ is set to a value 1, this may indicate that the 7 bits (D6, D5, D4, D3, D2, D1, and D0) following D7 in the 8-bit command code of the Register-0 Write command correspond to a 7-bit address and three payload bytes of interest to be processed at an upper half of a specified page in conjunction with the 7-bit address follow the Register-0 Write command (e.g., three payload bytes follow the BPC 412 of RFFE Register-0 Write command 402 or the BP 466 of SPMI Register-0 Write command 452).

FIG. 10 is a table 1000 illustrating a further example of configuration register bit values and a corresponding operation mode of the Register-0 Write command. As shown in FIG. 10, bits $B_k$, $B_{k-1}$, $B_{k-2}$, and $B_{k-3}$ may correspond to four consecutive register bits of a configuration register (e.g., register bits B5, B4, B3, and B2 of the configuration register 702).

When the bits $B_k$, $B_{k-1}$, $B_{k-2}$, and $B_{k-3}$ are all set to a value 0, this may indicate that the Register-0 Write command will be used in a legacy manner (legacy mode). That is, the 7 bits (D6, D5, D4, D3, D2, D1, and D0) following D7 in the 8-bit command code of the Register-0 Write command correspond to actual 7-bit data, and therefore, the 8-bit command code itself contains the data of interest to be processed.

When the bit $B_k$ is set to a value of 0, the bit $B_{k-1}$ is set to value of 0, the bit $B_{k-2}$ is set to a value 0, and the bit $B_{k-3}$ is set to a value of 1, this may indicate that the 7 bits (D6, D5, D4, D3, D2, D1, and D0) following D7 in the 8-bit command code of the Register-0 Write command correspond to a 7-bit address and one payload byte of interest to be processed at a lower half of a specified page in conjunction with the 7-bit address follows the Register-0 Write command.

When the bit $B_k$ is set to a value of 0, the bit $B_{k-1}$ is set to value of 0, the bit $B_{k-2}$ is set to a value 1, and the bit $B_{k-3}$ is set to a value of 0, this may indicate that the 7 bits (D6, D5, D4, D3, D2, D1, and D0) following D7 in the 8-bit command code of the Register-0 Write command correspond to a 7-bit address and two payload bytes of interest to be processed at a lower half of a specified page in conjunction with the 7-bit address follows the Register-0 Write command.

When the bit $B_k$ is set to a value of 0, the bit $B_{k-1}$ is set to value of 0, the bit $B_{k-2}$ is set to a value 1, and the bit $B_{k-3}$ is set to a value of 1, this may indicate that the 7 bits (D6, D5, D4, D3, D2, D1, and D0) following D7 in the 8-bit command code of the Register-0 Write command correspond to a 7-bit address and three payload bytes of interest to be processed at a lower half of a specified page in conjunction with the 7-bit address follows the Register-0 Write command.

When the bit $B_k$ is set to a value of 0, the bit $B_{k-1}$ is set to value of 1, the bit $B_{k-2}$ is set to a value 0, and the bit $B_{k-3}$ is set to a value of 0, this may indicate that the 7 bits (D6, D5, D4, D3, D2, D1, and D0) following D7 in the 8-bit command code of the Register-0 Write command correspond to a 7-bit address and four payload bytes of interest to be processed at a lower half of a specified page in conjunction with the 7-bit address follows the Register-0 Write command.

When the bit $B_k$ is set to a value of 0, the bit $B_{k-1}$ is set to value of 1, the bit $B_{k-2}$ is set to a value 0, and the bit $B_{k-3}$ is set to a value of 1, this may indicate that the 7 bits (D6, D5, D4, D3, D2, D1, and D0) following D7 in the 8-bit command code of the Register-0 Write command correspond to a 7-bit address and five payload bytes of interest to be processed at a lower half of a specified page in conjunction with the 7-bit address follows the Register-0 Write command.

When the bit $B_k$ is set to a value of 0, the bit $B_{k-1}$ is set to value of 1, the bit $B_{k-2}$ is set to a value 1, and the bit $B_{k-3}$ is set to a value of 0, this may indicate that the 7 bits (D6, D5, D4, D3, D2, D1, and D0) following D7 in the 8-bit command code of the Register-0 Write command correspond to a 7-bit address and six payload bytes of interest to be processed at a lower half of a specified page in conjunction with the 7-bit address follows the Register-0 Write command.

When the bit $B_k$ is set to a value of 0, the bit $B_{k-1}$ is set to value of 1, the bit $B_{k-2}$ is set to a value 1, and the bit $B_{k-3}$ is set to a value of 1, this may indicate that the 7 bits (D6, D5, D4, D3, D2, D1, and D0) following D7 in the 8-bit command code of the Register-0 Write command correspond to a 7-bit address and seven payload bytes of interest to be processed at a lower half of a specified page in conjunction with the 7-bit address follows the Register-0 Write command.

When the bit $B_k$ is set to a value of 1, the bit $B_{k-1}$ is set to value of 0, the bit $B_{k-2}$ is set to a value 0, and the bit $B_{k-3}$ is set to a value of 0, this may indicate that the Register-0 Write command will be used in a command code extension mode to indicate additional commands. That is, the 7 bits (D6, D5, D4, D3, D2, D1, and D0) following D7 in the 8-bit command code of the Register-0 Write command may correspond to one of a possible 128 command codes.

When the bit $B_k$ is set to a value of 1, the bit $B_{k-1}$ is set to value of 0, the bit $B_{k-2}$ is set to a value 0, and the bit $B_{k-3}$ is set to a value of 1, this may indicate that the 7 bits (D6, D5, D4, D3, D2, D1, and D0) following D7 in the 8-bit command code of the Register-0 Write command correspond to a 7-bit address and one payload byte of interest to be processed at an upper half of a specified page in conjunction with the 7-bit address follows the Register-0 Write command.

When the bit $B_k$ is set to a value of 1, the bit $B_{k-1}$ is set to value of 0, the bit $B_{k-2}$ is set to a value 1, and the bit $B_{k-3}$ is set to a value of 0, this may indicate that the 7 bits (D6, D5, D4, D3, D2, D1, and D0) following D7 in the 8-bit command code of the Register-0 Write command correspond to a 7-bit address and two payload bytes of interest to be processed at an upper half of a specified page in conjunction with the 7-bit address follows the Register-0 Write command.

When the bit $B_k$ is set to a value of 1, the bit $B_{k-1}$ is set to value of 0, the bit $B_{k-2}$ is set to a value 1, and the bit $B_{k-3}$ is set to a value of 1, this may indicate that the 7 bits (D6, D5, D4, D3, D2, D1, and D0) following D7 in the 8-bit command code of the Register-0 Write command correspond to a 7-bit address and three payload bytes of interest to be processed at an upper half of a specified page in conjunction with the 7-bit address follows the Register-0 Write command.

When the bit $B_k$ is set to a value of 1, the bit $B_{k-1}$ is set to value of 1, the bit $B_{k-2}$ is set to a value 0, and the bit $B_{k-3}$ is set to a value of 0, this may indicate that the 7 bits (D6, D5, D4, D3, D2, D1, and D0) following D7 in the 8-bit command code of the Register-0 Write command correspond to a 7-bit address and four payload bytes of interest to be processed at an upper half of a specified page in conjunction with the 7-bit address follows the Register-0 Write command.

When the bit $B_k$ is set to a value of 1, the bit $B_{k-1}$ is set to value of 1, the bit $B_{k-2}$ is set to a value 0, and the bit $B_{k-3}$ is set to a value of 1, this may indicate that the 7 bits (D6, D5, D4, D3, D2, D1, and D0) following D7 in the 8-bit command code of the Register-0 Write command correspond to a 7-bit address and five payload bytes of interest to be processed at an upper half of a specified page in conjunction with the 7-bit address follows the Register-0 Write command.

When the bit $B_k$ is set to a value of 1, the bit $B_{k-1}$ is set to value of 1, the bit $B_{k-2}$ is set to a value 1, and the bit $B_{k-3}$ is set to a value of 0, this may indicate that the 7 bits (D6, D5, D4, D3, D2, D1, and D0) following D7 in the 8-bit command code of the Register-0 Write command correspond to a 7-bit address and six payload bytes of interest to be processed at an upper half of a specified page in conjunction with the 7-bit address follows the Register-0 Write command.

When the bit $B_k$ is set to a value of 1, the bit $B_{k-1}$ is set to value of 1, the bit $B_{k-2}$ is set to a value 1, and the bit $B_{k-3}$ is set to a value of 1, this may indicate that the 7 bits (D6, D5, D4, D3, D2, D1, and D0) following D7 in the 8-bit command code of the Register-0 Write command correspond to a 7-bit address and seven payload bytes of interest to be processed at an upper half of a specified page in conjunction with the 7-bit address follows the Register-0 Write command.

Overview of Page Register

In an aspect of the disclosure, an 8-bit page-address register may be utilized to provide a control function interface to further facilitate the functional extending of the Register-0 Write command. The page-address register may be located within a user defined register space: 0x01 to 0x1C in hexadecimal. For example, register location 0x19 may be used as the page-address register. However, in alternative aspects, it is contemplated that the page-address register may be at any location within an entire register space.

Figure 11:
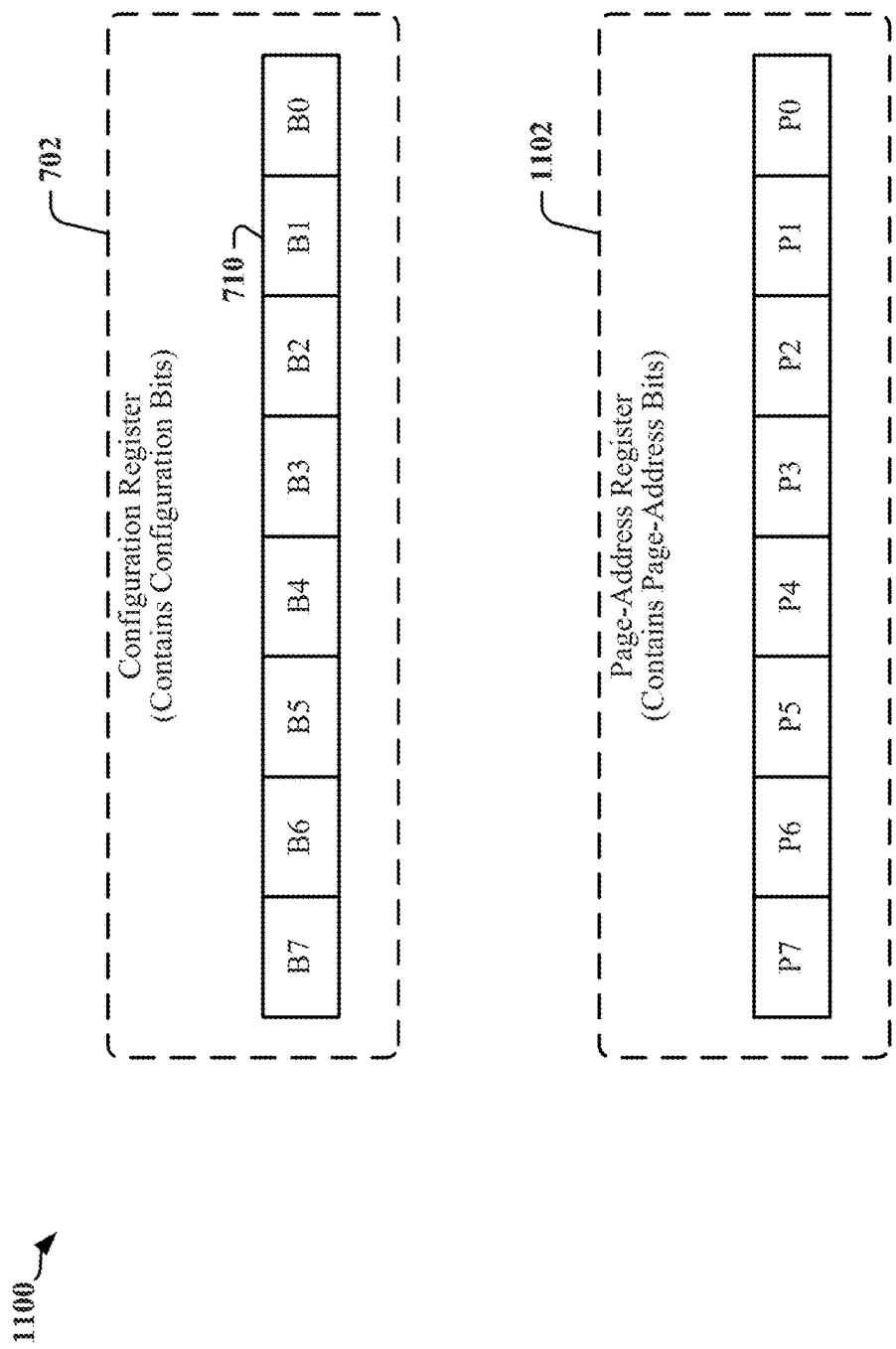
FIG. 11 is a diagram illustrating an example bit structure of a configuration register and an example bit structure of a page-address register in accordance with certain aspects disclosed herein.

FIG. 11 is a diagram 1100 illustrating an example bit structure of a configuration register 702 and an example bit structure of a page-address register 1102. As shown, the configuration register 702 is the same as the configuration register described with respect to FIG. 7, which includes eight configuration register bits B7, B6, B5, B4, B3, B2, B1, and B). The page-address register 1102 includes eight page-address bits P7, P6, P5, P4, P3, P2, P1, and P0.

In an aspect of the disclosure, a single register bit of the configuration register 702 may be used to indicate that page segmented access (PSA) is enabled when the functionality of the Register-0 Write command is extended. For example, a register bit B1 710 may be used for such purpose, although it is contemplated that any other single register bit may be used. Referring to FIG. 11, page segmented access (PSA) may be enabled or disabled by enabling (e.g., setting to "1") or disabling (e.g., setting to "0") the register bit B1 710.

When PSA is enabled in the configuration register 702, the page-address bits (P7, P6, P5, P4, P3, P1, P1, and P0) of the page-address register 1102 may correspond to a page address at which the one or more payload bytes of interest following the Register-0 Write command are to be processed. Notably, if PSA is not enabled in the configuration register 702, the page address at which the one or more payload bytes of interest are to be processed may follow the Register-0 Write command.

Figure 12:
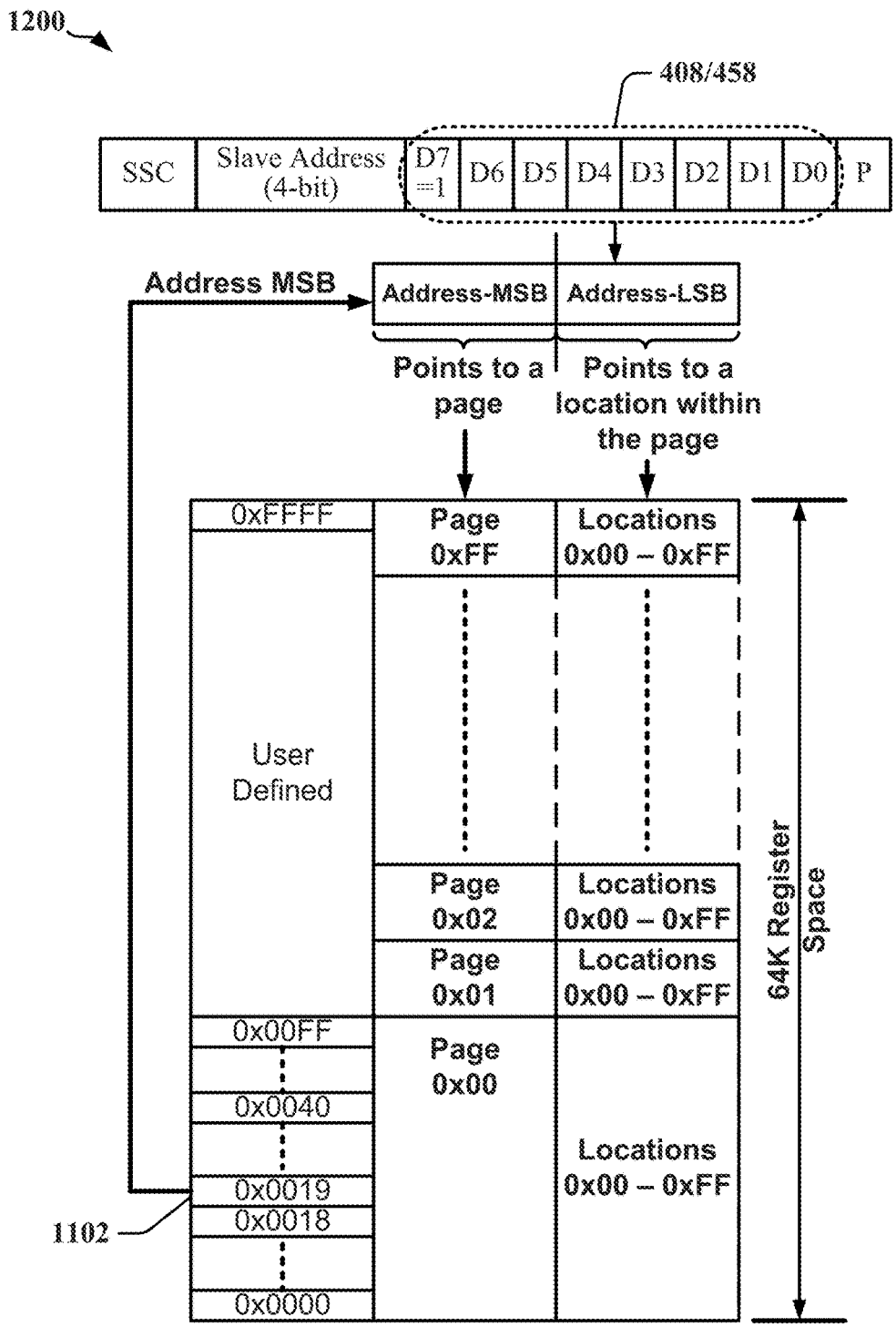
FIG. 12 is a diagram illustrating page segmented access (PSA) in accordance with certain aspects disclosed herein.

FIG. 12 is a diagram 1200 illustrating page segmented access (PSA). Standard extended register operations are based on an 8-bit register address. This may limit the applicability of these modes of register access to the first 256 locations of a register space (0x00 to 0xFF). Accordingly, page segmented access (PSA) for an extended register operation may be an alternative to standard extended register long operations in terms of accessing an entire 64K register space while using only an 8-bit register address in the datagram. Because only an 8-bit register address is used, page segmented access also allows for a maximum payload of 16 bytes per datagram.

64K register space access may be enabled for an extended Register-0 Write command by using the page-address register 1102 described above to serve as a register address-MSB location. Page segmented access (PSA) for the extended Register-0 Write command may be enabled using a 1-byte register holding the register address-MSB and a single configuration bit included in the configuration register.

PSA may use a value located at register location 0x19 as the register address-MSB and concatenate the register address-MSB with an 8-bit register address-LSB supplied in the Register-0 Write command Here, the 8-bit register address-LSB may correspond to the bits (D7=1, D6, D5, D4, D3, D2, D1, and D0) in the 8-bit command code of the Register-0 Write command.

Page segmented access using the content of register location 0x19 and an address-LSB retrieved from the Register-0 Write command is shown in FIG. 12. The page-address register 1102 at register location 0x19 may contain an 8-bit MSB value for the register address in the 0x0000 to 0xFFFF register space. The value from the register location 0x19 may be used as an address-MSB and combined with the 8-bit address 408/458 (address-LSB) received from the Register-0 Write command. Accordingly, the entire 64K register space may be accessed using only an 8-bit register address 408/458 in the Register-0 Write command. The value at register location 0x19 has no effect on the extended Register-0 Write command if the page segment access (PSA) mode is disabled.

PSA may be enabled or disabled by enabling (e.g., setting to "1") or disabling (e.g., setting to "0") a single configuration bit (e.g., configuration bit B1 710) within a configuration register located at register location 0x18. When enabled, an 8-bit page address stored at register location 0x19 may serve as a register address-MSB and may be attached to an 8-bit address (serving as a register address-LSB) supplied within the Register-0 Write command.

Exemplary Method and Device for Sending a Write Command

Figure 13:
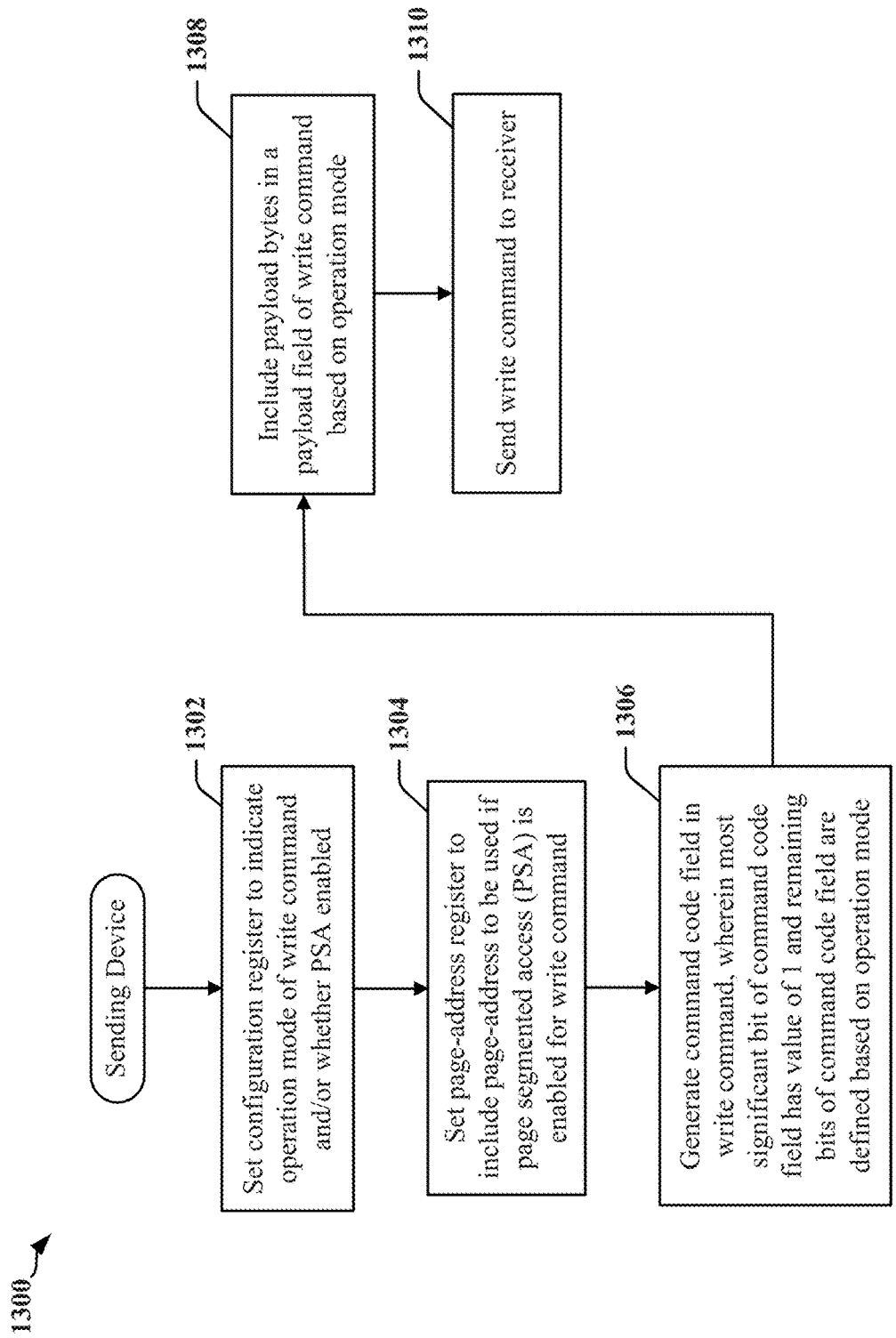
FIG. 13 is a flow chart of a method of sending a write command to a receiver in accordance with certain aspects disclosed herein.

FIG. 13 is a flow chart 1300 of a method of sending a write command (e.g., Register-0 Write command) to a receiver via a bus interface. The method may be performed at a device operating as a sending device (e.g., bus master).

The device may set a configuration register to indicate an operation mode of the write command 1302. This may include setting three or four consecutive bits in the configuration register to indicate the operation mode of the write command Additionally or alternatively, the device may also set the configuration register to indicate whether page segmented access (PSA) for the write command is enabled. For example, the device may set a single bit in the configuration register to a certain value to indicate whether the PSA for the write command is enabled (e.g., setting to "1" enabled, setting to "0" disabled). The device may further set a page-address register to include a page-address to be used if the PSA is enabled for the write command 1304.

The device may generate a command code field (e.g., command code field 408 or command code field 458) in the write command 1306. In an aspect, a most significant bit of the command code field has a value of 1 and remaining bits of the command code field are defined based on the operation mode.

The device may include payload bytes in a payload field of the write command based on the operation mode 1308. Thereafter, the device may send the write command to the receiver 1310.

In an aspect, if the operation mode is a first mode (e.g., legacy mode), the remaining bits of the command code field are defined as data bits to be processed by the receiver. Accordingly, the payload field includes no payload bytes. Moreover, a first consecutive bit is set to a value of 0, a second consecutive bit is set to a value of 0, and a third consecutive bit is set to a value of 0 in the configuration register if the operation mode is the first mode.

In a further aspect, if the operation mode is a second mode (e.g., command code extension mode), the remaining bits of the command code field are defined as code bits corresponding to one of 128 command codes. Accordingly, the payload field includes at least one payload byte that corresponds to the code bits and is to be processed by the receiver. Moreover, a first consecutive bit is set to a value of 1, a second consecutive bit is set to a value of 0, and a third consecutive bit is set to a value of 0 in the configuration register if the operation mode is the second mode.

In another aspect, if the operation mode is a third mode (e.g., address extension mode), the most significant bit and the remaining bits of the command code field are defined as address bits corresponding to a register address. Accordingly, the payload field includes at least one payload byte that is to be processed by the receiver with respect to the register address. Moreover, if the PSA is enabled, the page-address included in the page-address register concatenated with the register address provides a register space location in which the receiver is to process the at least one payload byte.

In an aspect, a first consecutive bit is set to a value of 0, a second consecutive bit is set to a value of 0, and a third consecutive bit is set to a value of 1 in the configuration register if the operation mode is the third mode and the payload field includes one payload byte that is to be processed by the receiver at a lower half of a page associated with the register address.

In a further aspect, the first consecutive bit is set to a value of 0, the second consecutive bit is set to a value of 1, and the third consecutive bit is set to a value of 0 in the configuration register if the operation mode is the third mode and the payload field includes two payload bytes that are to be processed by the receiver at the lower half of the page associated with the register address.

In another aspect, the first consecutive bit is set to a value of 0, the second consecutive bit is set to a value of 1, and the third consecutive bit is set to a value of 1 in the configuration register if the operation mode is the third mode and the payload field includes three payload bytes that are to be processed by the receiver at the lower half of the page associated with the register address.

In an aspect, the first consecutive bit is set to a value of 1, the second consecutive bit is set to a value of 0, and the third consecutive bit is set to a value of 1 in the configuration register if the operation mode is the third mode and the payload field includes one payload byte that is to be processed by the receiver at an upper half of the page associated with the register address.

In a further aspect, the first consecutive bit is set to a value of 1, the second consecutive bit is set to a value of 1, and the third consecutive bit is set to a value of 0 in the configuration register if the operation mode is the third mode and the payload field includes two payload bytes that are to be processed by the receiver at the upper half of the page associated with the register address.

In another aspect, the first consecutive bit is set to a value of 1, the second consecutive bit is set to a value of 1, and the third consecutive bit is set to a value of 1 in the configuration register if the operation mode is the third mode and the payload field includes three payload bytes that are to be processed by the receiver at the upper half of the page associated with the register address.

Figure 14:
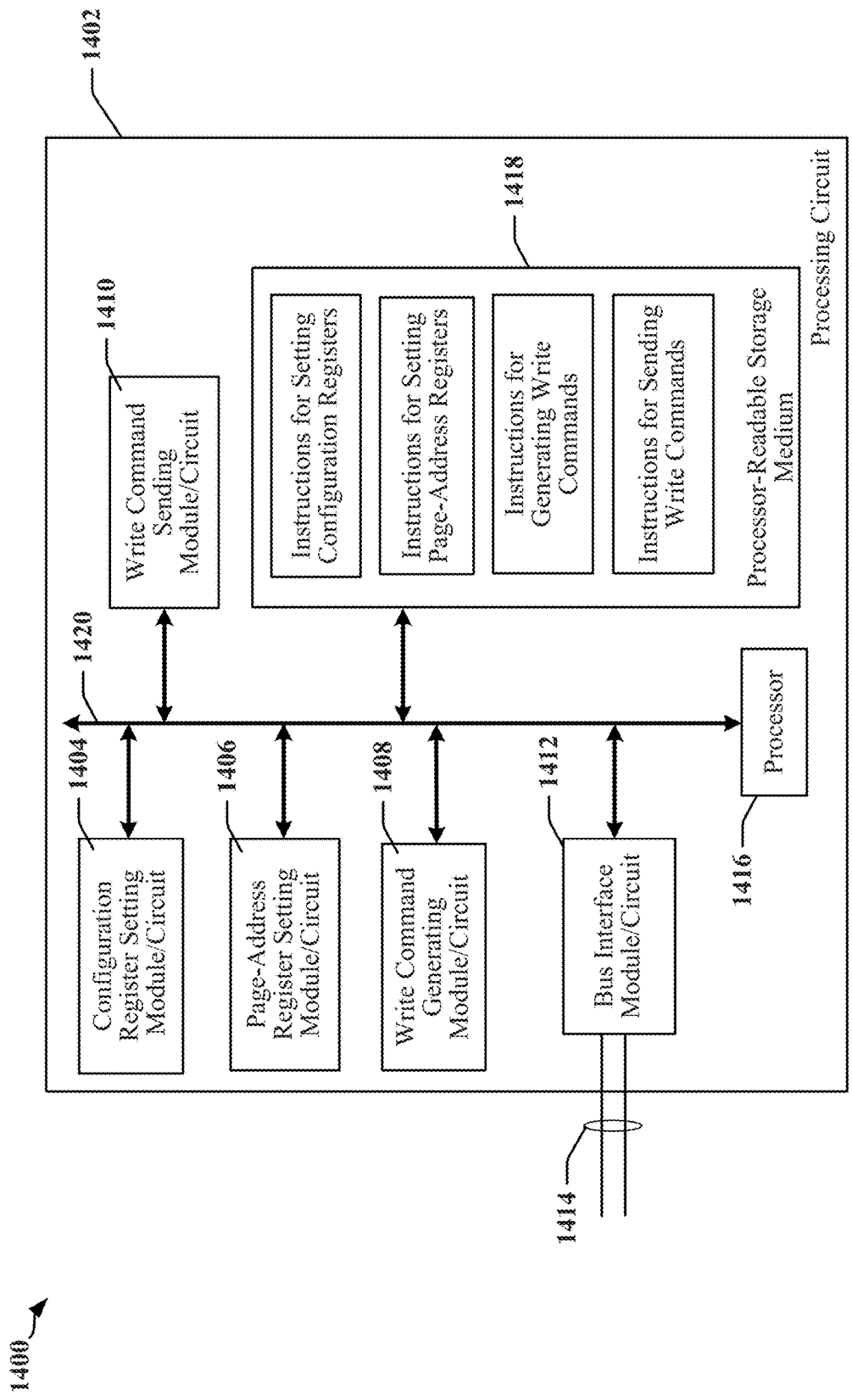
FIG. 14 is a diagram illustrating an example of a hardware implementation for a sending apparatus and employing a processing circuit adapted according to certain aspects disclosed herein.

FIG. 14 is a diagram illustrating a simplified example of a hardware implementation for a sending apparatus 1400 employing a processing circuit 1402. Examples of operations performed by the sending apparatus 1400 include the operations described above with respect to the flow chart of FIG. 13. The processing circuit typically has a processor 1416 that may include one or more of a microprocessor, microcontroller, digital signal processor, a sequencer and a state machine. The processing circuit 1402 may be implemented with a bus architecture, represented generally by the bus 1420. The bus 1420 may include any number of interconnecting buses and bridges depending on the specific application of the processing circuit 1402 and the overall design constraints. The bus 1420 links together various circuits including one or more processors and/or hardware modules, represented by the processor 1416, the modules or circuits 1404, 1406, 1408, 1410, bus interface circuits 1412 configurable to support communication over connectors or wires 1414 and the computer-readable storage medium 1418. The bus 1420 may also link various other circuits such as timing sources, peripherals, voltage regulators, and power management circuits, which are well known in the art, and therefore, will not be described any further.

The processor 1416 is responsible for general processing, including the execution of software/instructions stored on the computer-readable storage medium 1418. The software/instructions, when executed by the processor 1416, causes the processing circuit 1402 to perform the various functions described supra for any particular apparatus. The computer-readable storage medium may also be used for storing data that is manipulated by the processor 1416 when executing software, including data decoded from symbols transmitted over the connectors or wires 1414, which may be configured as data lanes and clock lanes. The processing circuit 1402 further includes at least one of the modules/circuits 1404, 1406, 1408, and 1410. The modules/circuits 1404, 1406, 1408, and 1410 may be software modules running in the processor 1416, resident/stored in the computer-readable storage medium 1418, one or more hardware modules coupled to the processor 1416, or some combination thereof. The modules/circuits 1404, 1406, 1408, and/or 1410 may include microcontroller instructions, state machine configuration parameters, or some combination thereof.

In one configuration, the apparatus 1400 for communication includes a configuration register setting module/circuit 1404 that is configured to, set a configuration register to indicate an operation mode of the write command and/or indicate whether page segmented access (PSA) for the write command is enabled. The apparatus 1400 further includes a page-address register setting module/circuit 1406 that is configured to, set a page-address register to include a page-address to be used if the PSA is enabled for the write command. The apparatus 1400 further includes a write command generating module/circuit 1408 that is configured to, generate a command code field in the write command, wherein a most significant bit of the command code field has a value of 1 and remaining bits of the command code field are defined based on the operation mode, and is further configured to, include payload bytes in a payload field of the write command based on the operation mode. The apparatus 1400 further includes a write command sending module/circuit 1410 that is configured to, send the write command through the bus interface module/circuit 1412 to the receiver.

Exemplary Method and Device for Receiving a Write Command

Figure 15:
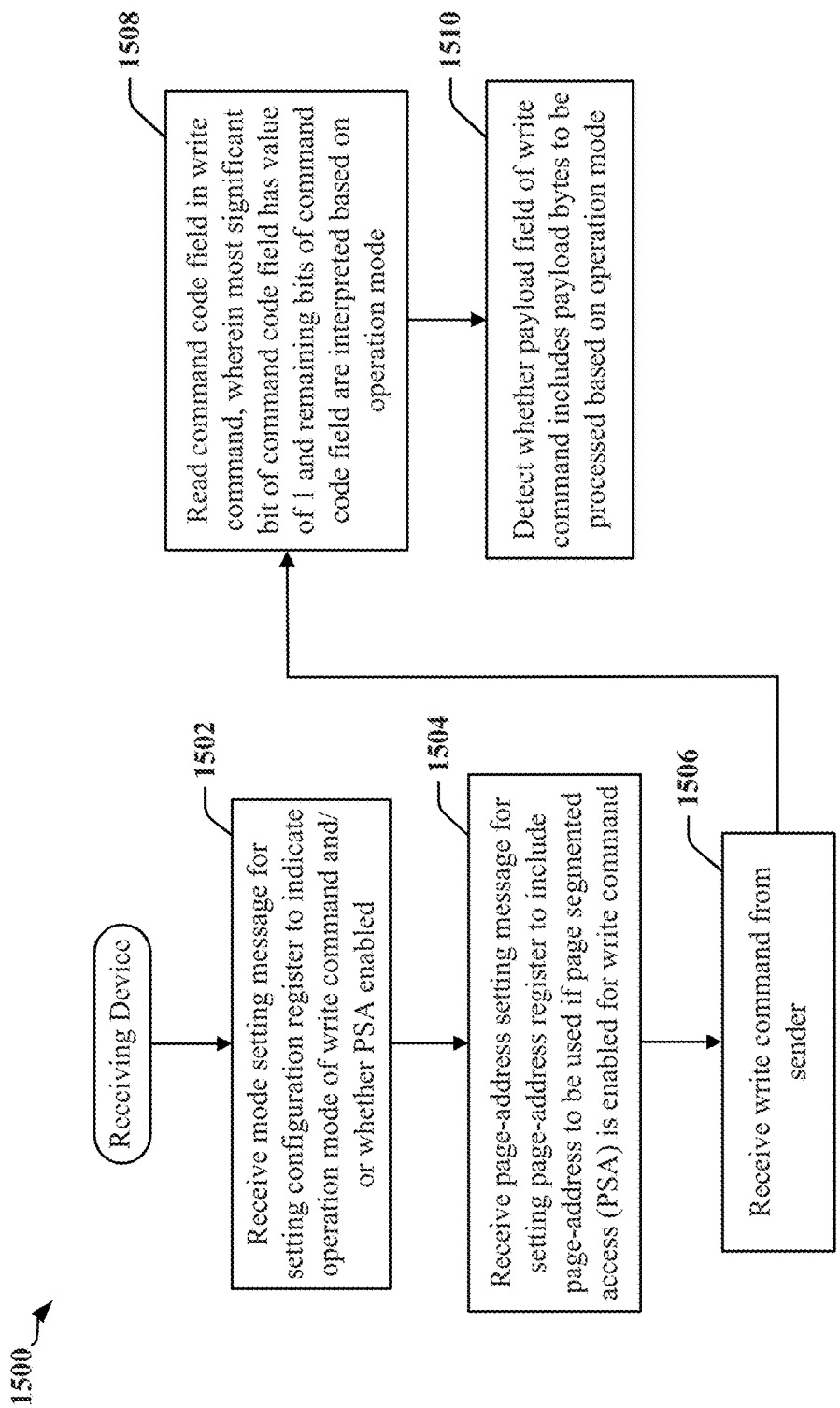
FIG. 15 is a flow chart of a method of receiving a write command from a sender in accordance with certain aspects disclosed herein.

FIG. 15 is a flow chart 1500 of a method of receiving a write command (e.g., Register-0 Write command) from a sender via a bus interface. The method may be performed at a device operating as a receiving device (e.g., bus slave).

The device may receive a mode setting message for setting a configuration register to indicate an operation mode of the write command 1502. Setting the configuration register may include setting three or four consecutive bits in the configuration register to indicate the operation mode of the write command Additionally or alternatively, the mode setting message may further set the configuration register to indicate whether page segmented access (PSA) for the write command is enabled. This may be performed by setting a single bit in the configuration register to a certain value to indicate whether the PSA for the write command is enabled (e.g., setting to "1" enabled, setting to "0" disabled). The device may further receive a page-address setting message for setting a page-address register to include a page-address to be used if the PSA is enabled for the write command 1504.

The device may receive the write command from the sender 1506. Thereafter, the device may read a command code field in the write command 1508. In an aspect, a most significant bit of the command code field has a value of 1 and remaining bits of the command code field are interpreted based on the operation mode. The device may then detect whether a payload field of the write command includes payload bytes to be processed based on the operation mode 1510.

In an aspect, if the operation mode is a first mode (e.g., legacy mode), the remaining bits of the command code field are interpreted as data bits to be processed by the receiver. Accordingly, the payload field includes no payload bytes to be processed. Moreover, a first consecutive bit is set to a value of 0, a second consecutive bit is set to a value of 0, and a third consecutive bit is set to a value of 0 in the configuration register if the operation mode is the first mode.

In another aspect, if the operation mode is a second mode (e.g., command code extension mode), the remaining bits of the command code field are interpreted as code bits corresponding to one of 128 command codes. Accordingly, the payload field includes at least one payload byte that corresponds to the code bits and is to be processed. Moreover, a first consecutive bit is set to a value of 1, a second consecutive bit is set to a value of 0, and a third consecutive bit is set to a value of 0 in the configuration register if the operation mode is the second mode.

In a further aspect, if the operation mode is a third mode (e.g., address extension mode), the most significant bit and the remaining bits of the command code field are interpreted as address bits corresponding to a register address. Accordingly, the payload field includes at least one payload byte that is to be processed with respect to the register address. Moreover, if the PSA is enabled, the page-address included in the page-address register concatenated with the register address provides a register space location in which the at least one payload byte is to be processed.

In an aspect, a first consecutive bit is set to a value of 0, a second consecutive bit is set to a value of 0, and a third consecutive bit is set to a value of 1 in the configuration register if the operation mode is the third mode and the payload field includes one payload byte that is to be processed at a lower half of a page associated with the register address.

In another aspect, the first consecutive bit is set to a value of 0, the second consecutive bit is set to a value of 1, and the third consecutive bit is set to a value of 0 in the configuration register if the operation mode is the third mode and the payload field includes two payload bytes that are to be processed at the lower half of the page associated with the register address.

In a further aspect, the first consecutive bit is set to a value of 0, the second consecutive bit is set to a value of 1, and the third consecutive bit is set to a value of 1 in the configuration register if the operation mode is the third mode and the payload field includes three payload bytes that are to be processed at the lower half of the page associated with the register address.

In an aspect, the first consecutive bit is set to a value of 1, the second consecutive bit is set to a value of 0, and the third consecutive bit is set to a value of 1 in the configuration register if the operation mode is the third mode and the payload field includes one payload byte that is to be processed at an upper half of the page associated with the register address.

In another aspect, the first consecutive bit is set to a value of 1, the second consecutive bit is set to a value of 1, and the third consecutive bit is set to a value of 0 in the configuration register if the operation mode is the third mode and the payload field includes two payload bytes that are to be processed at the upper half of the page associated with the register address.

In a further aspect, the first consecutive bit is set to a value of 1, the second consecutive bit is set to a value of 1, and the third consecutive bit is set to a value of 1 in the configuration register if the operation mode is the third mode and the payload field includes three payload bytes that are to be processed at the upper half of the page associated with the register address.

Figure 16:
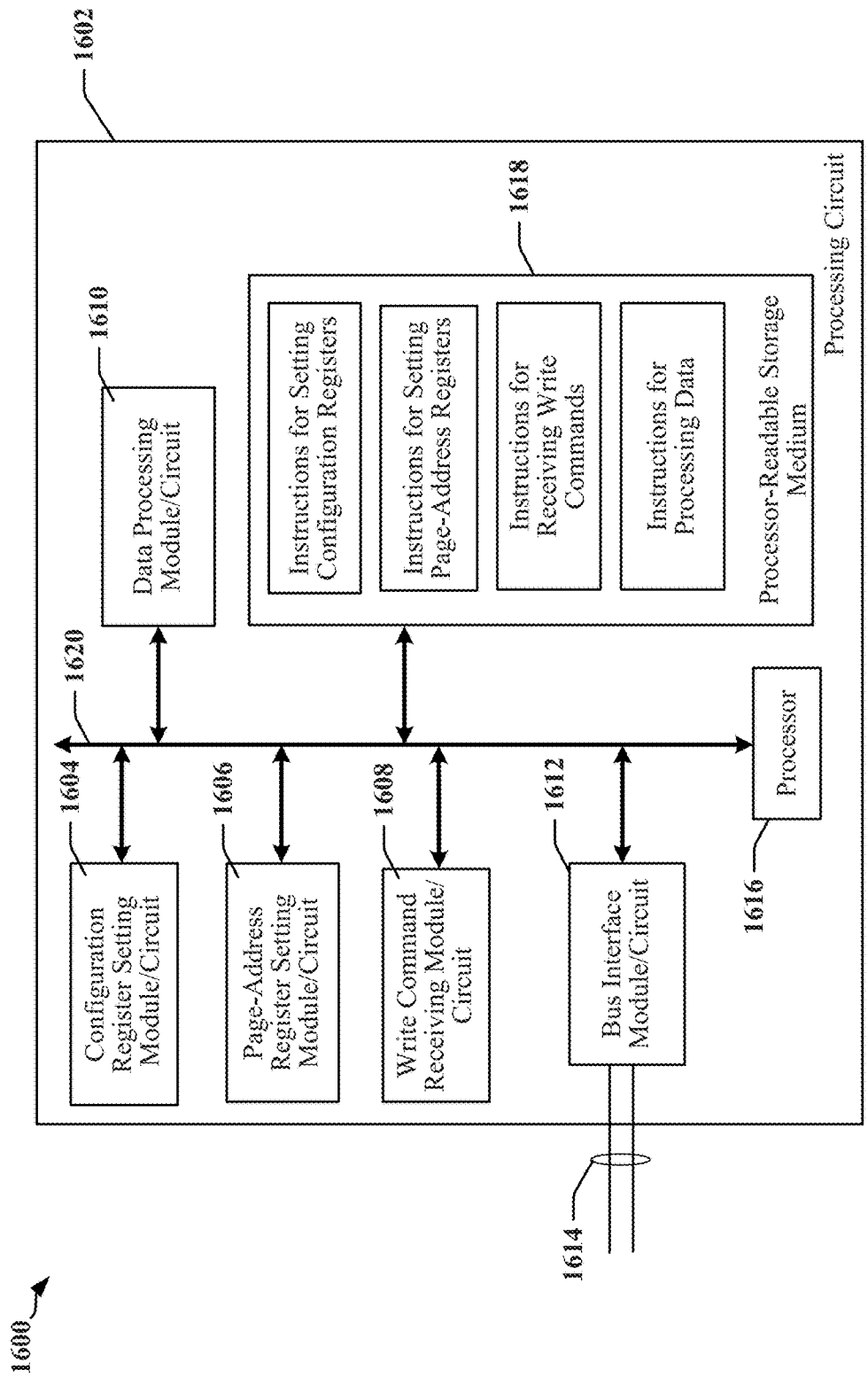
FIG. 16 is a diagram illustrating an example of a hardware implementation for a receiving apparatus and employing a processing circuit adapted according to certain aspects disclosed herein.

FIG. 16 is a diagram illustrating a simplified example of a hardware implementation for a receiving apparatus 1600 employing a processing circuit 1602. Examples of operations performed by the receiving apparatus 1600 include the operations described above with respect to the flow chart of FIG. 15. The processing circuit typically has a processor 1616 that may include one or more of a microprocessor, microcontroller, digital signal processor, a sequencer and a state machine. The processing circuit 1602 may be implemented with a bus architecture, represented generally by the bus 1620. The bus 1620 may include any number of interconnecting buses and bridges depending on the specific application of the processing circuit 1602 and the overall design constraints. The bus 1620 links together various circuits including one or more processors and/or hardware modules, represented by the processor 1616, the modules or circuits 1604, 1606, 1608, 1610, bus interface circuits 1612 configurable to support communication over connectors or wires 1614 and the computer-readable storage medium 1618. The bus 1620 may also link various other circuits such as timing sources, peripherals, voltage regulators, and power management circuits, which are well known in the art, and therefore, will not be described any further.

The processor 1616 is responsible for general processing, including the execution of software/instructions stored on the computer-readable storage medium 1618. The software/instructions, when executed by the processor 1616, causes the processing circuit 1602 to perform the various functions described supra for any particular apparatus. The computer-readable storage medium may also be used for storing data that is manipulated by the processor 1616 when executing software, including data decoded from symbols transmitted over the connectors or wires 1614, which may be configured as data lanes and clock lanes. The processing circuit 1602 further includes at least one of the modules/circuits 1604, 1606, 1608, and 1610. The modules/circuits 1604, 1606, 1608, and 1610 may be software modules running in the processor 1616, resident/stored in the computer-readable storage medium 1618, one or more hardware modules coupled to the processor 1616, or some combination thereof. The modules/circuits 1604, 1606, 1608, and/or 1610 may include microcontroller instructions, state machine configuration parameters, or some combination thereof.

In one configuration, the apparatus 1600 for communication includes a configuration register setting module/circuit 1604 that is configured to, receive a mode setting message for setting a configuration register to indicate an operation mode of the write command, wherein the mode setting message further sets the configuration register to indicate whether page segmented access (PSA) for the write command is enabled. The apparatus 1600 further includes a page-address register setting module/circuit 1606 that is configured to, receive a page-address setting message for setting a page-address register to include a page-address to be used if the PSA is enabled for the write command. The apparatus 1600 further includes a write command receiving module/circuit 1608 that is configured to, receiving the write command from the sender via the bus interface module/circuit 1612. The apparatus 1600 also includes a data processing module/circuit 1610 that is configured to, reading a command code field in the write command, wherein a most significant bit of the command code field has a value of 1 and remaining bits of the command code field are interpreted based on the operation mode, and detect whether a payload field of the write command includes payload bytes to be processed based on the operation mode.

It is understood that the specific order or hierarchy of steps in the processes disclosed is an illustration of exemplary approaches. The specific order or hierarchy of steps in the processes may be rearranged based upon design preferences. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of sending a write command to a receiver via a bus interface, comprising:
   setting three or four consecutive bits in a configuration register to indicate an operation mode of the write command;
   generating a command code field in the write command, wherein a most significant bit of the command code field has a value of 1 and remaining bits of the command code field are defined based on the operation mode;
   including payload bytes in a payload field of the write command based on the operation mode; and
   sending the write command to the receiver.

2. The method of claim 1, wherein if the operation mode is a first mode:
   the remaining bits of the command code field are defined as data bits to be processed by the receiver; and
   the payload field includes no payload bytes.

3. The method of claim 2, wherein a first consecutive bit is set to a value of 0, a second consecutive bit is set to a value of 0, and a third consecutive bit is set to a value of 0 in the configuration register if the operation mode is the first mode.

4. The method of claim 1, wherein if the operation mode is a second mode:
   the remaining bits of the command code field are defined as code bits corresponding to one of 128 command codes; and
   the payload field includes at least one payload byte that corresponds to the code bits and is to be processed by the receiver.

5. The method of claim 4, wherein a first consecutive bit is set to a value of 1, a second consecutive bit is set to a value of 0, and a third consecutive bit is set to a value of 0 in the configuration register if the operation mode is the second mode.

6. The method of claim 1, wherein if the operation mode is a third mode:
   the most significant bit and the remaining bits of the command code field are defined as address bits corresponding to a register address; and
   the payload field includes at least one payload byte that is to be processed by the receiver with respect to the register address.

7. The method of claim 6, wherein:
   a first consecutive bit is set to a value of 0, a second consecutive bit is set to a value of 0, and a third consecutive bit is set to a value of 1 in the configuration register if the operation mode is the third mode and the payload field includes one payload byte that is to be processed by the receiver at a lower half of a page associated with the register address;
   the first consecutive bit is set to a value of 0, the second consecutive bit is set to a value of 1, and the third consecutive bit is set to a value of 0 in the configuration register if the operation mode is the third mode and the payload field includes two payload bytes that are to be processed by the receiver at the lower half of the page associated with the register address;

the first consecutive bit is set to a value of 0, the second consecutive bit is set to a value of 1, and the third consecutive bit is set to a value of 1 in the configuration register if the operation mode is the third mode and the payload field includes three payload bytes that are to be processed by the receiver at the lower half of the page associated with the register address;

the first consecutive bit is set to a value of 1, the second consecutive bit is set to a value of 0, and the third consecutive bit is set to a value of 1 in the configuration register if the operation mode is the third mode and the payload field includes one payload byte that is to be processed by the receiver at an upper half of the page associated with the register address;

the first consecutive bit is set to a value of 1, the second consecutive bit is set to a value of 1, and the third consecutive bit is set to a value of 0 in the configuration register if the operation mode is the third mode and the payload field includes two payload bytes that are to be processed by the receiver at the upper half of the page associated with the register address; and the first consecutive bit is set to a value of 1, the second consecutive bit is set to a value of 1, and the third consecutive bit is set to a value of 1 in the configuration register if the operation mode is the third mode and the payload field includes three payload bytes that are to be processed by the receiver at the upper half of the page associated with the register address.

8. The method of claim 6, further including:
setting a page-address register to include a page-address to be used if page segmented access (PSA) is enabled for the write command; and
setting the configuration register to indicate whether the PSA for the write command is enabled.

9. The method of claim 8, wherein the setting the configuration register includes:
setting a single bit in the configuration register to indicate whether the PSA for the write command is enabled.

10. The method of claim 8, wherein if the PSA is enabled, the page-address included in the page-address register concatenated with the register address provides a register space location in which the receiver is to process the at least one payload byte.

11. A sending device for sending a write command to a receiver, comprising:
a bus interface; and
a processing circuit configured to:
set three or four consecutive bits in a configuration register to indicate an operation mode of the write command,
generate a command code field in the write command, wherein a most significant bit of the command code field has a value of 1 and remaining bits of the command code field are defined based on the operation mode,
include payload bytes in a payload field of the write command based on the operation mode, and
send the write command to the receiver via the bus interface.

12. The sending device of claim 11, the processing circuit further configured to:
set a page-address register to include a page-address to be used if page segmented access (PSA) is enabled for the write command; and
set the configuration register to indicate whether the PSA for the write command is enabled.

13. The sending device of claim 12, wherein the processing circuit configured to set the configuration register is further configured to:
set a single bit in the configuration register to indicate whether the PSA for the write command is enabled.

14. A method of receiving a write command from a sender via a bus interface, comprising:
receiving a mode setting message for setting three or four consecutive bits in a configuration register to indicate an operation mode of the write command;
receiving the write command from the sender;
reading a command code field in the write command, wherein a most significant bit of the command code field has a value of 1 and remaining bits of the command code field are interpreted based on the operation mode; and
detecting whether a payload field of the write command includes payload bytes to be processed based on the operation mode.

15. The method of claim 14, wherein if the operation mode is a first mode:
the remaining bits of the command code field are interpreted as data bits to be processed; and
the payload field includes no payload bytes to be processed.

16. The method of claim 15, wherein a first consecutive bit is set to a value of 0, a second consecutive bit is set to a value of 0, and a third consecutive bit is set to a value of 0 in the configuration register if the operation mode is the first mode.

17. The method of claim 14, wherein if the operation mode is a second mode:
the remaining bits of the command code field are interpreted as code bits corresponding to one of 128 command codes; and
the payload field includes at least one payload byte that corresponds to the code bits and is to be processed.

18. The method of claim 17, wherein a first consecutive bit is set to a value of 1, a second consecutive bit is set to a value of 0, and a third consecutive bit is set to a value of 0 in the configuration register if the operation mode is the second mode.

19. The method of claim 14, wherein if the operation mode is a third mode:
the most significant bit and the remaining bits of the command code field are interpreted as address bits corresponding to a register address; and
the payload field includes at least one payload byte that is to be processed with respect to the register address.

20. The method of claim 19, wherein:
a first consecutive bit is set to a value of 0, a second consecutive bit is set to a value of 0, and a third consecutive bit is set to a value of 1 in the configuration register if the operation mode is the third mode and the payload field includes one payload byte that is to be processed at a lower half of a page associated with the register address;
the first consecutive bit is set to a value of 0, the second consecutive bit is set to a value of 1, and the third consecutive bit is set to a value of 0 in the configuration register if the operation mode is the third mode and the payload field includes two payload bytes that are to be processed at the lower half of the page associated with the register address;
the first consecutive bit is set to a value of 0, the second consecutive bit is set to a value of 1, and the third consecutive bit is set to a value of 1 in the configuration register if the operation mode is the third mode and the payload field includes three payload bytes that are to be processed at the lower half of the page associated with the register address;

the first consecutive bit is set to a value of 1, the second consecutive bit is set to a value of 0, and the third consecutive bit is set to a value of 1 in the configuration register if the operation mode is the third mode and the payload field includes one payload byte that is to be processed at an upper half of the page associated with the register address;

the first consecutive bit is set to a value of 1, the second consecutive bit is set to a value of 1, and the third consecutive bit is set to a value of 0 in the configuration register if the operation mode is the third mode and the payload field includes two payload bytes that are to be processed at the upper half of the page associated with the register address; and the first consecutive bit is set to a value of 1, the second consecutive bit is set to a value of 1, and the third consecutive bit is set to a value of 1 in the configuration register if the operation mode is the third mode and the payload field includes three payload bytes that are to be processed at the upper half of the page associated with the register address.

21. The method of claim 19, further including:

receiving a page-address setting message for setting a page-address register to include a page-address to be used if page segmented access (PSA) is enabled for the write command, wherein the mode setting message further sets the configuration register to indicate whether the PSA for the write command is enabled.

22. The method of claim 21, wherein the mode setting message sets a single bit in the configuration register to indicate whether the PSA for the write command is enabled.

23. The method of claim 21, wherein if the PSA is enabled, the page-address included in the page-address register concatenated with the register address provides a register space location in which the at least one payload byte is to be processed.

24. A receiving device for receiving a write command from a sender, comprising:

a bus interface; and a processing circuit configured to:

receive a mode setting message for setting three or four consecutive bits in a configuration register to indicate an operation mode of the write command, receive the write command from the sender via the bus interface, read a command code field in the write command, wherein a most significant bit of the command code field has a value of 1 and remaining bits of the command code field are interpreted based on the operation mode, and detect whether a payload field of the write command includes payload bytes to be processed based on the operation mode.

25. The receiving device of claim 24, the processing circuit further configured to:

receive a page-address setting message for setting a page-address register to include a page-address to be used if page segmented access (PSA) is enabled for the write command, wherein the mode setting message further sets the configuration register to indicate whether the PSA for the write command is enabled.

26. The receiving device of claim 25, wherein the mode setting message sets a single bit in the configuration register to indicate whether the PSA for the write command is enabled.

* * * * *